US012705398B2

(12) United States Patent
Park et al.

(10) Patent No.: US 12,705,398 B2
(45) Date of Patent: Aug. 11, 2026

(54) YOUTH APPLICATION WITH PARENTAL GUIDANCE ROLE

(71) Applicant: The Toronto-Dominion Bank, Toronto (CA)

(72) Inventors: Sophie Na-Hyun Park, Toronto (CA); Susan McCloskey, Coldwater (CA); Ekaterina Nikiforova, Toronto (CA); Joelle D'Souza, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 149 days.

(21) Appl. No.: 18/614,784

(22) Filed: Mar. 25, 2024

(65) Prior Publication Data

US 2025/0298925 A1 Sep. 25, 2025

(51) Int. Cl.
*G06F 21/62* (2013.01)
*G09B 5/02* (2006.01)

(52) U.S. Cl.
CPC ............ *G06F 21/629* (2013.01); *G09B 5/02* (2013.01)

(58) Field of Classification Search
CPC ................................ G06F 21/629; G09B 5/02
See application file for complete search history.

(56) References Cited

U.S. PATENT DOCUMENTS 9,864,982 B2 1/2018 Bristow et al.
9,912,697 B2 3/2018 Dorfman et al.
9,973,502 B2 5/2018 Gupta et al.
10,038,938 B1 7/2018 Roe et al.
10,163,085 B2 12/2018 D'Agostino et al.
10,178,246 B1 1/2019 Horvath et al.
10,181,114 B2 1/2019 Tseretopoulos et al.
10,231,019 B2 3/2019 Cobb et al.
10,339,931 B2 7/2019 Tseretopoulos et al.
10,346,824 B2 7/2019 Chan et al.
10,360,303 B2 7/2019 Volkovs et al.
10,405,146 B1 9/2019 Kuruvilla et al.
10,438,206 B2 10/2019 Jivraj et al.
10,440,196 B2 10/2019 Horvath et al.
10,440,197 B2 10/2019 Horvath et al.
(Continued)

OTHER PUBLICATIONS

Heglin et al., "Auto-Adjudication Process Via Machine Learning," U.S. Appl. No. 19/053,942, filed Feb. 14, 2025.

*Primary Examiner* — Mohamed A. Wasel

(57) ABSTRACT

An example operation may include one or more of onboarding a user with a child version of a software application, wherein the onboarding comprises storing an account characteristic within an account profile of the software application, connecting a parent version of the software application to the child version of the software application, wherein the connecting comprises enabling the parent version of the software application to control functionality within the child version of the software application, determining that a current account characteristic of the user with the child version of the software application has reached a predetermined account characteristic threshold based on the account characteristic stored within the account profile and a system clock of a host platform of the software application, and in response, automatically disconnecting the parent version of the software application from the child version of the software application.

20 Claims, 24 Drawing Sheets

(56) References Cited

U.S. PATENT DOCUMENTS 10,460,748 B2 10/2019 Tseretopoulos et al.
10,482,675 B1 11/2019 Sutter et al.
10,630,677 B1 * 4/2020 Li .......................... G06Q 10/40
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
10,776,619 B2 9/2020 Collinson et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëtté et al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
2016/0335424 A1 * 11/2016 Hampson ........... G06Q 10/0639
2018/0268818 A1 9/2018 Schoenmackers et al.
2019/0172045 A1 6/2019 Dunjic et al.
2019/0230091 A1 7/2019 Marlin et al.
2020/0058068 A1 2/2020 Gandhi et al.
2021/0027160 A1 1/2021 Volkovs et al.
2021/0037040 A1 2/2021 Aleks et al.
2021/0117893 A1 4/2021 Sohum et al.
2021/0232950 A1 7/2021 Kono
2021/0264461 A1 8/2021 Fam
2021/0342020 A1 * 11/2021 Jorasch .................. G06F 3/038
2021/0407016 A1 12/2021 Kuruvilla et al.
2022/0058489 A1 2/2022 Volkovs et al.
2022/0108069 A1 4/2022 Lee
2022/0132208 A1 4/2022 Garg et al.
2022/0157094 A1 5/2022 Moghtadai et al.
2022/0171845 A1 6/2022 Kumar et al.
2022/0172083 A1 6/2022 Wu et al.

(56) References Cited

U.S. PATENT DOCUMENTS

2022/0188705 A1 6/2022 Davoodi et al.
2022/0198411 A1 6/2022 Jones et al.
2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0405299 A1 12/2022 Leung et al.
2022/0414495 A1 12/2022 Stanevich et al.
2023/0006809 A1 1/2023 Shpurov et al.
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëtté et al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.
2024/0420010 A1 12/2024 Cirulis et al.
2024/0420011 A1 12/2024 Cirulis et al.
2024/0428283 A1 12/2024 Belbahri et al.
2025/0013363 A1 1/2025 Estoesta et al.
2025/0013697 A1 1/2025 Estoesta et al.
2025/0013927 A1 1/2025 Rho et al.
2025/0014010 A1 1/2025 Jones et al.
2025/0014052 A1 1/2025 Bhattacharjee et al.
2025/0028852 A1 1/2025 Chowanski et al.
2025/0028934 A1 1/2025 Wong et al.
2025/0029012 A1 1/2025 Rho et al.
2025/0045601 A1 2/2025 Zuberi et al.
2025/0053387 A1 2/2025 Wang et al.
2025/0068646 A1 2/2025 Rahman et al.
2025/0068853 A1 2/2025 Lu
2025/0069063 A1 2/2025 Navarro et al.
2025/0077187 A1 3/2025 Guttridge et al.
2025/0077188 A1 3/2025 Guttridge et al.
2025/0077189 A1 3/2025 Guttridge et al.
2025/0077190 A1 3/2025 Guttridge et al.
2025/0077204 A1 3/2025 Guttridge et al.
2025/0077227 A1 3/2025 Guttridge et al.
2025/0077396 A1 3/2025 Sen
2025/0077397 A1 3/2025 Sen
2025/0077399 A1 3/2025 Sen
2025/0077400 A1 3/2025 Sen
2025/0077556 A1 3/2025 Guttridge et al.
2025/0077681 A1 3/2025 Sen
2025/0077682 A1 3/2025 Guttridge et al.
2025/0077939 A1 3/2025 Tabatabaei et al.
2025/0078324 A1 3/2025 Gormley
2025/0078325 A1 3/2025 Gormley
2025/0078344 A1 3/2025 Gormley
2025/0078345 A1 3/2025 Gormley
2025/0078972 A1 3/2025 Gormley
2025/0085936 A1 3/2025 Guttridge et al.
2025/0086096 A1 3/2025 Guttridge et al.
2025/0086440 A1 3/2025 Erb et al.
2025/0086441 A1 3/2025 Guttridge et al.
2025/0086451 A1 3/2025 Guttridge et al.

(56) References Cited

U.S. PATENT DOCUMENTS

2025/0086551 A1 3/2025 Zhao
2025/0094437 A1 3/2025 Upendran
2025/0103609 A1 3/2025 Upendran
2025/0103961 A1 3/2025 Cresswell et al.
2025/0103980 A1 3/2025 Deljavan Farshi et al.
2025/0104024 A1 3/2025 Abbas
2025/0104029 A1 3/2025 Deljavan Farshi et al.
2025/0104047 A1 3/2025 Mashkevich
2025/0104050 A1 3/2025 Mashkevich
2025/0104059 A1 3/2025 Mashkevich
2025/0104074 A1 3/2025 Tsang et al.
2025/0104306 A1 3/2025 Mashkevich
2025/0104700 A1 3/2025 Henault-Ethier et al.
2025/0106060 A1 3/2025 Gormley et al.
2025/0106201 A1 3/2025 Gormley
2025/0110805 A1 4/2025 Starszyk et al.
2025/0117411 A1 4/2025 Mohammed
2025/0117595 A1 4/2025 Taheri
2025/0117596 A1 4/2025 Taheri
2025/0117623 A1 4/2025 Devarajan et al.
2025/0117629 A1 4/2025 Pandey et al.
2025/0117630 A1 4/2025 Taheri
2025/0117769 A1 4/2025 Taheri
2025/0117836 A1 4/2025 Taheri et al.
2025/0117853 A1 4/2025 Pandey et al.
2025/0117854 A1 4/2025 Pandey et al.
2025/0117855 A1 4/2025 Pandey et al.
2025/0117856 A1 4/2025 Pandey et al.
2025/0119396 A1 4/2025 Taheri
2025/0119494 A1 4/2025 Pandey et al.
2025/0119495 A1 4/2025 Pandey et al.
2025/0124039 A1 4/2025 Cashion et al.
2025/0124240 A1 4/2025 Luo et al.
2025/0131718 A1 4/2025 Ma et al.
2025/0138838 A1 5/2025 Ramesh et al.
2025/0139267 A1 5/2025 Zykh et al.
2025/0139382 A1 5/2025 Mohammed et al.
2025/0139708 A1 5/2025 Bouëtté et al.
2025/0147733 A1 5/2025 Abbas et al.
2025/0148321 A1 5/2025 Stanevich et al.
2025/0165375 A1 5/2025 Cresswell et al.
2025/0165866 A1 5/2025 Cresswell et al.
2025/0173170 A1 5/2025 Glynn-Udrow et al.
2025/0173568 A1 5/2025 Cresswell et al.
2025/0173618 A1 5/2025 Cresswell et al.
2025/0173619 A1 5/2025 Cresswell et al.
2025/0173725 A1 5/2025 Devarajan et al.
2025/0181321 A1 6/2025 Gormley
2025/0182028 A1 6/2025 Gormley
2025/0182196 A1 6/2025 Gormley
2025/0182222 A1 6/2025 Gormley
2025/0191062 A1 6/2025 Heglin et al.
2025/0217175 A1 7/2025 Karbasi et al.
2025/0225560 A1 7/2025 Bajaj et al.
2025/0231668 A1 7/2025 Tao et al.
2025/0231750 A1 7/2025 Lim et al.
2025/0231774 A1 7/2025 Tao et al.
2025/0231775 A1 7/2025 Tao et al.
2025/0231793 A1 7/2025 Lim et al.
2025/0232130 A1 7/2025 Tao et al.
2025/0232351 A1 7/2025 Tao et al.
2025/0232375 A1 7/2025 Tao et al.
2025/0232376 A1 7/2025 Tao et al.
2025/0232377 A1 7/2025 Tao et al.
2025/0232503 A1 7/2025 Lim et al.
2025/0238536 A1 7/2025 Nikoghossian et al.
2025/0245071 A1 7/2025 Ionescu et al.
2025/0245511 A1 7/2025 D'Agostino et al.
2025/0321651 A1* 10/2025 Jorasch ............... G06F 3/03543

* cited by examiner

Figure 1:
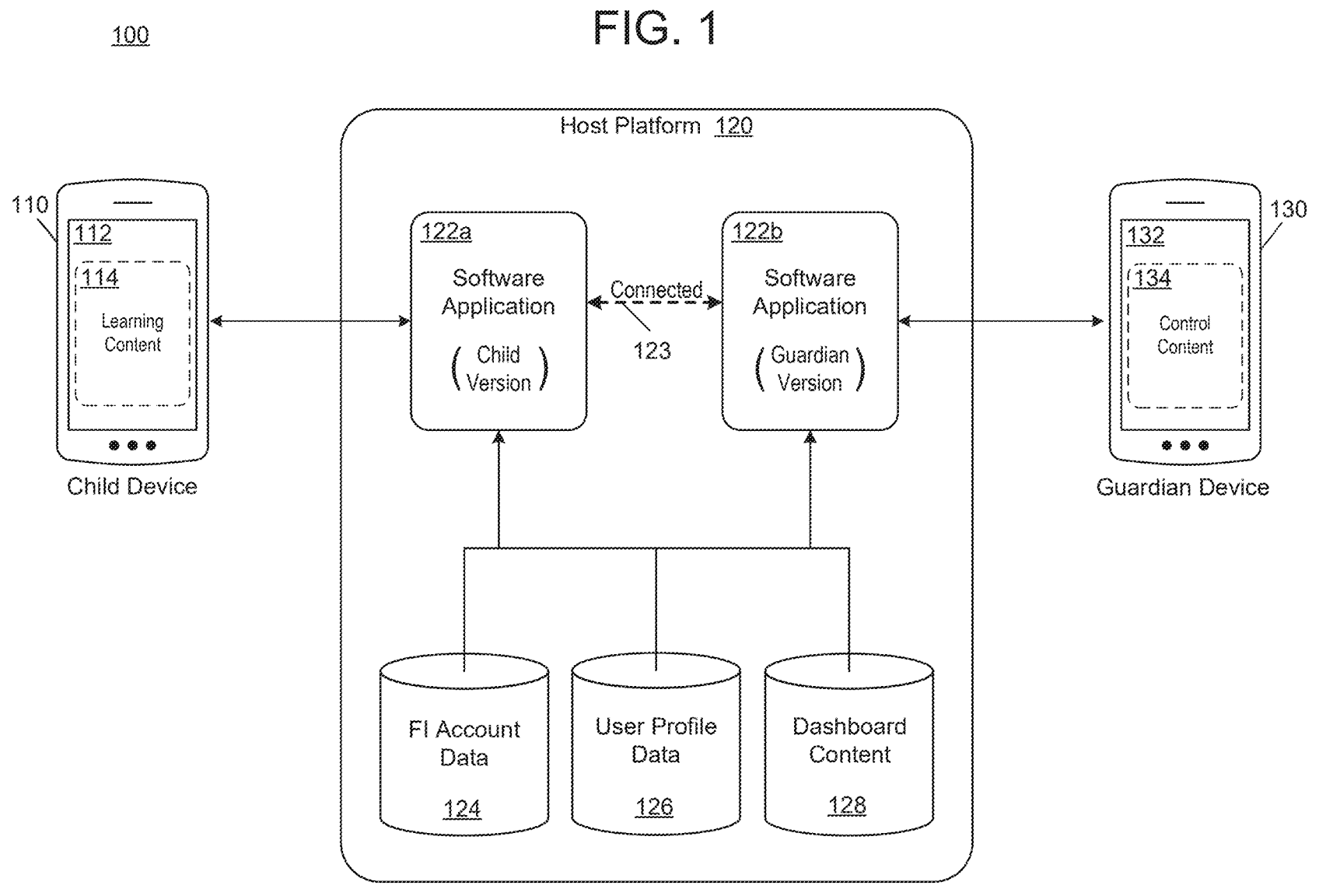

Host Platform 120

122a
Software Application (Child Version)

122b
Software Application (Guardian Version)

Connected

123

FI Account Data
124

User Profile Data
126

Dashboard Content
128

110

112

114
Learning Content

Child Device

130

132

134
Control Content

Guardian Device 200B
210
212
Create Avatar
230
232
Color
234
Hairstyle
236
Expression
User Device
Design Avatar
Host Platform 220
222a
Software Application
( Child Version )
Update Profile
Update Profile
Dashboard Content
224
User Profile Data
226

Figure 2D:
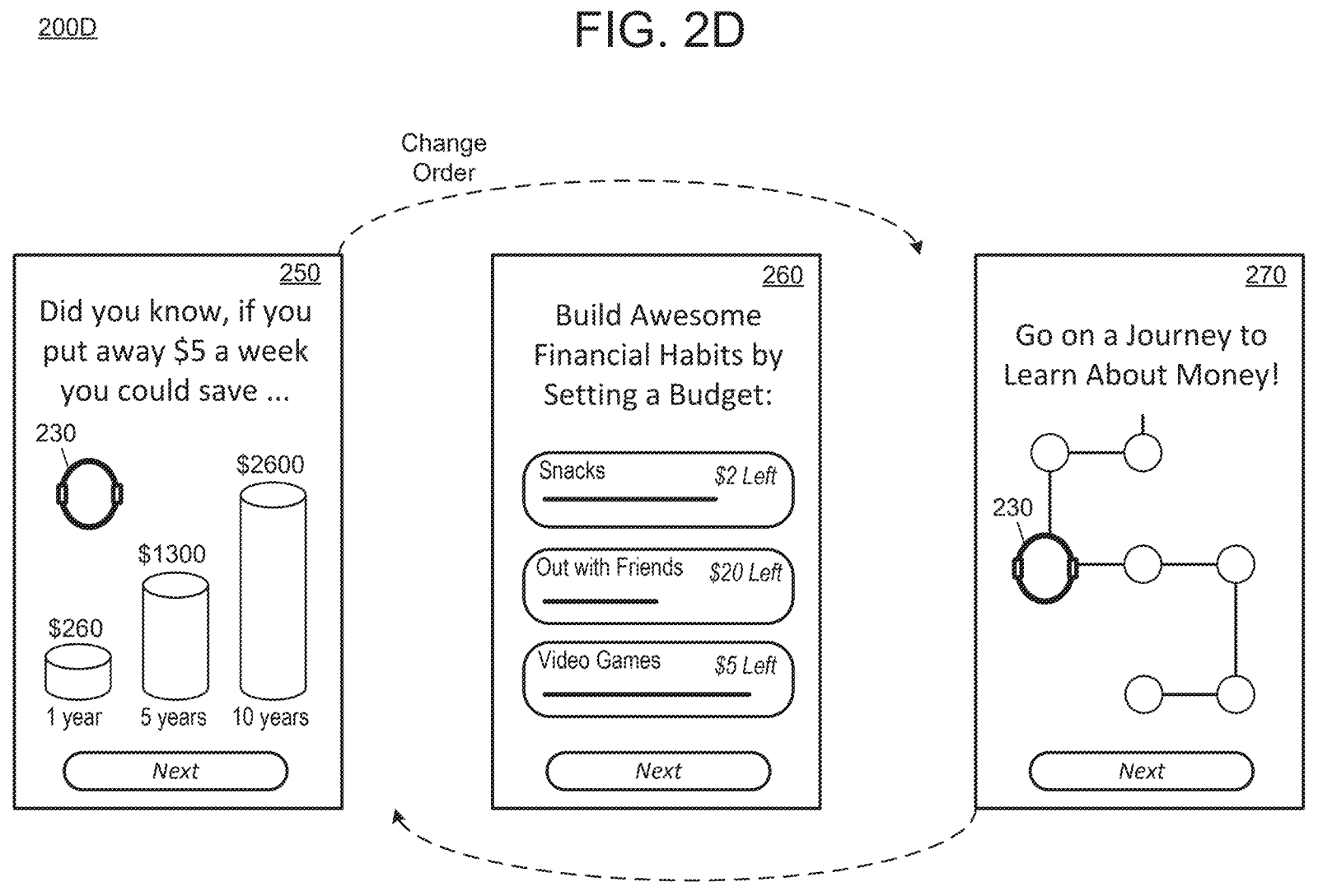

Change Order

250

Did you know, if you put away $5 a week you could save ...

230

$260

$1300

$2600

1 year 5 years 10 years

Next

260

Build Awesome Financial Habits by Setting a Budget:

Snacks $2 Left

Out with Friends $20 Left

Video Games $5 Left

Next

270

Go on a Journey to Learn About Money!

230

Next

300A 300B
310
User Device
Request
Dynamically Morph Content
Host Platform 330
Determine New Age Category
332
Software Application
( Child Version )
336
System Clock
Dashboard Content
334
User Profile Data
338

Figure 4A:
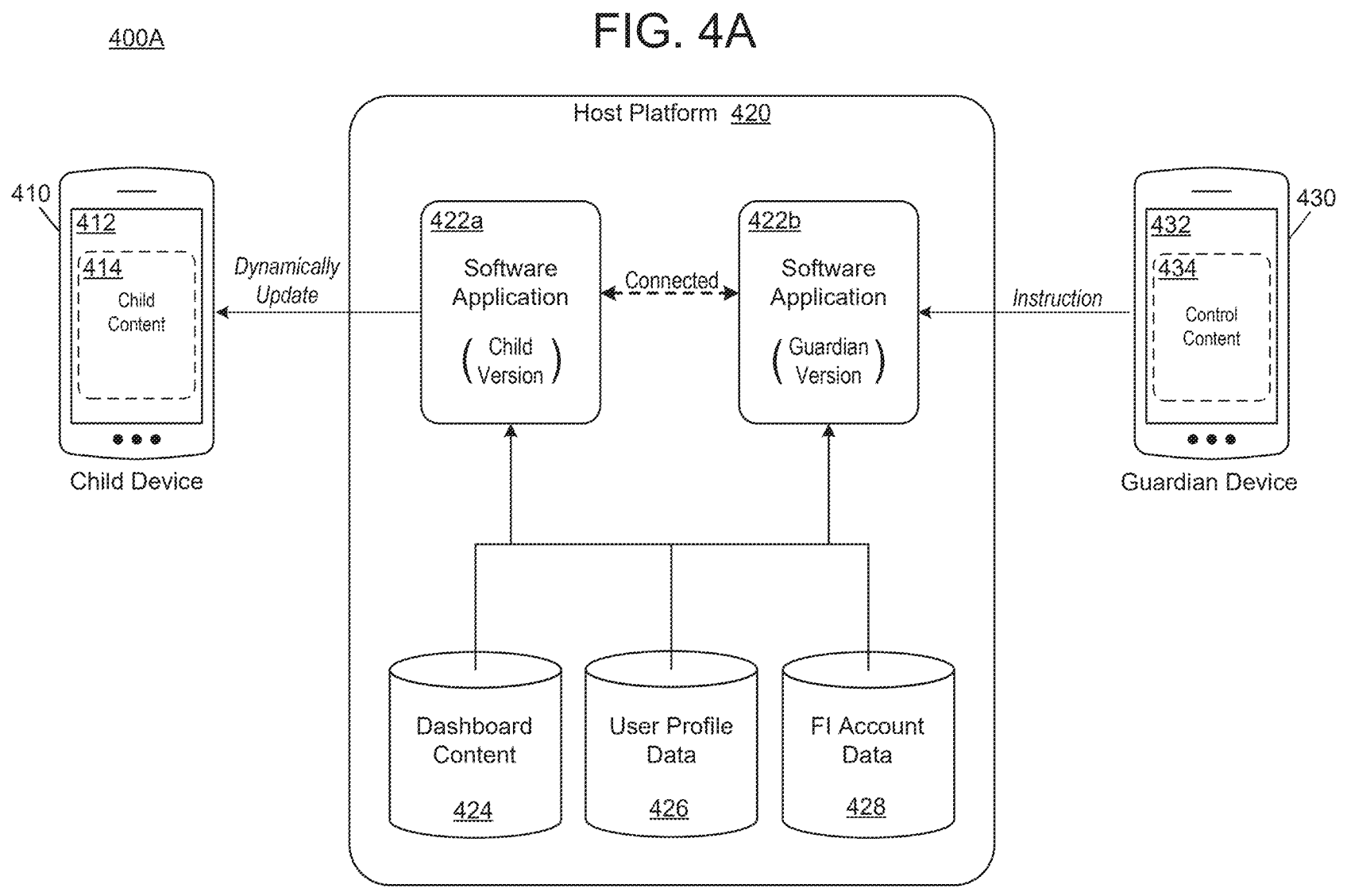

Host Platform 420

410 Child Device
412
414 Child Content

*Dynamically Update*

422a Software Application (Child Version)

Connected

422b Software Application (Guardian Version)

*Instruction*

430 Guardian Device
432
434 Control Content

Dashboard Content 424

User Profile Data 426

FI Account Data 428

Figure 4C:
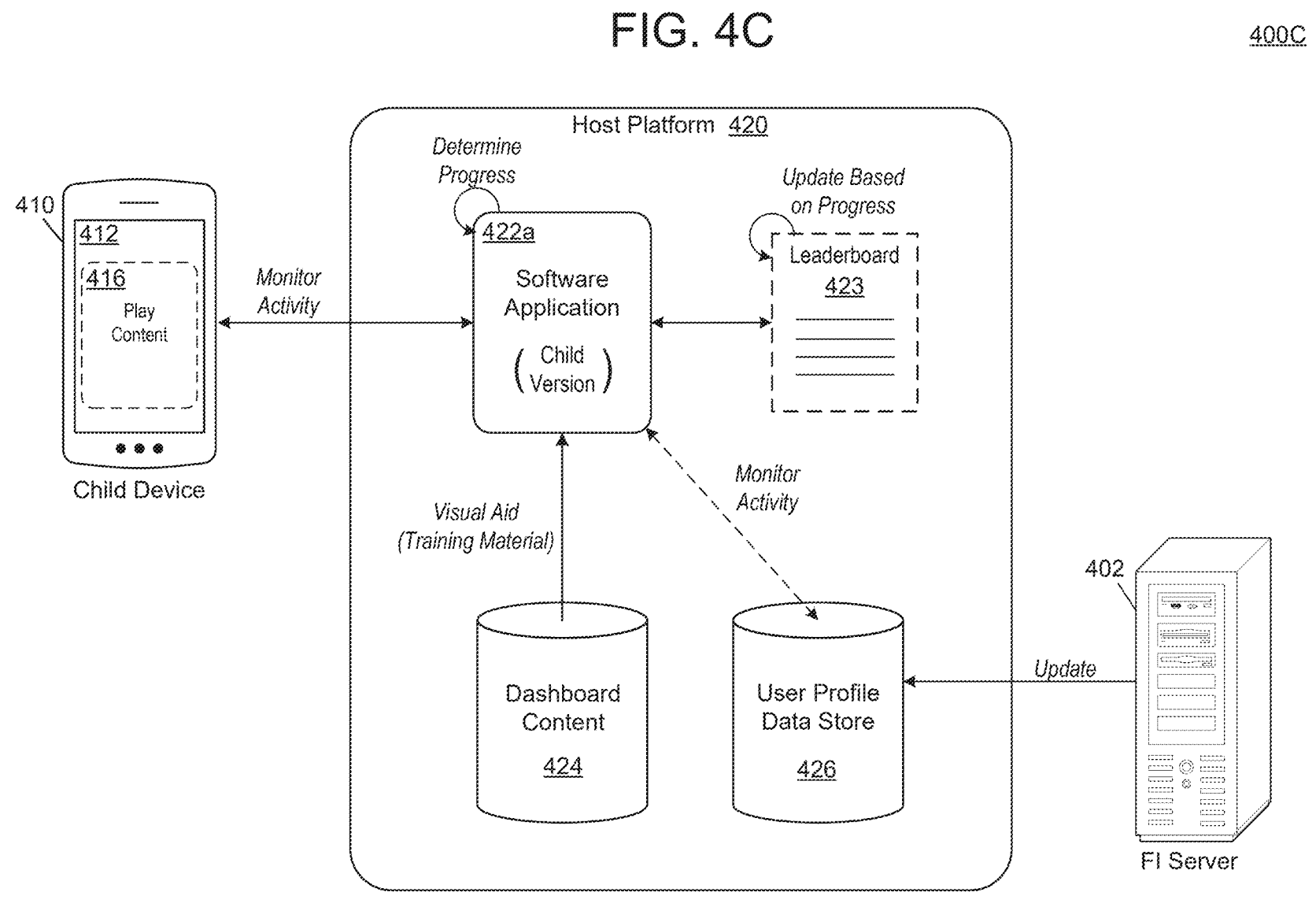

Host Platform 420

Determine Progress

422a Software Application (Child Version)

Update Based on Progress

Leaderboard 423

Monitor Activity

Visual Aid (Training Material)

Dashboard Content 424

User Profile Data Store 426

Update

402

FI Server

Monitor Activity

410

412

416 Play Content

Child Device

Figure 4E:
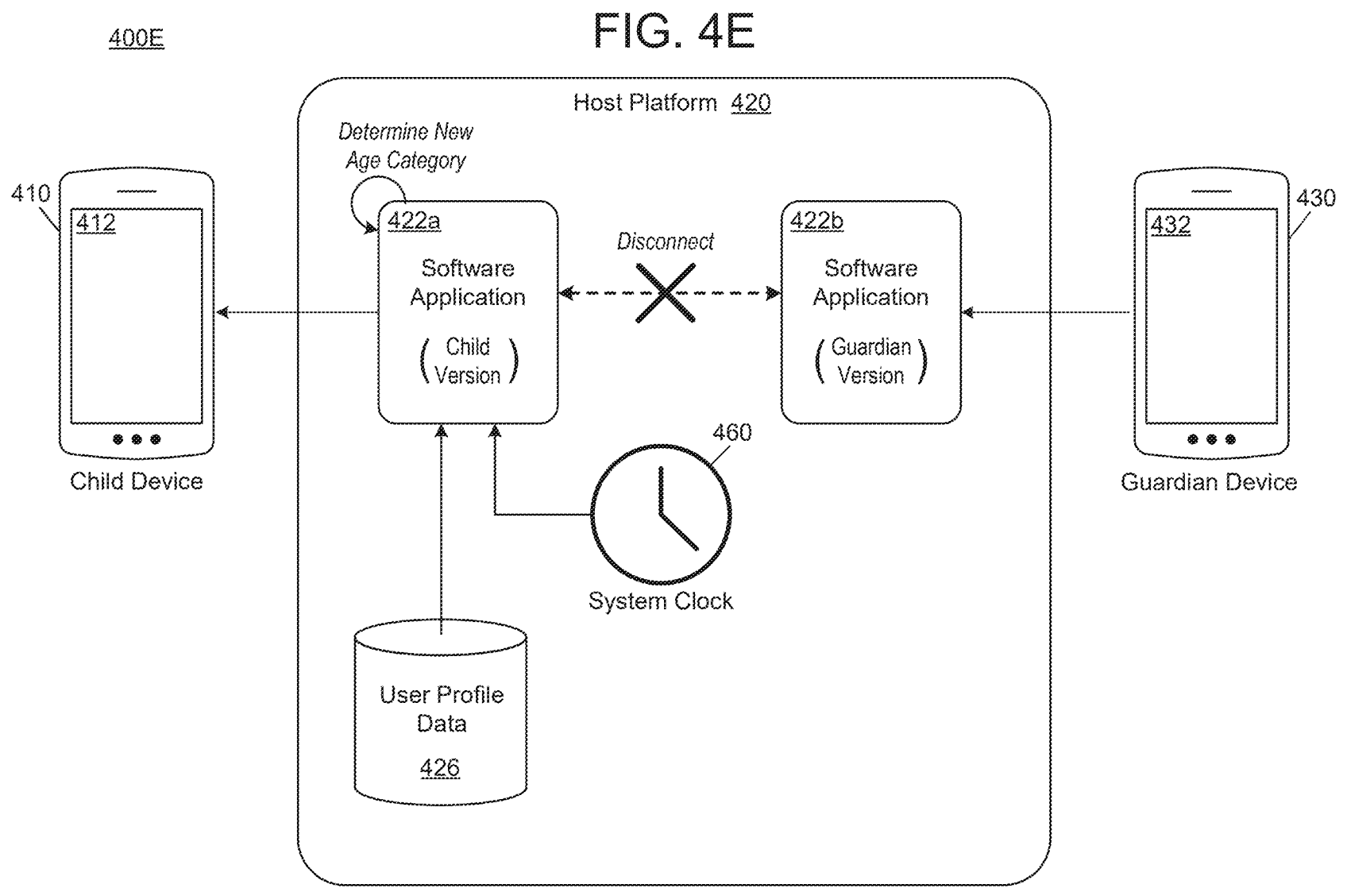

Host Platform 420

410

412

Child Device

430

432

Guardian Device

422a

Software Application (Child Version)

Determine New Age Category

422b

Software Application (Guardian Version)

Disconnect

460

System Clock

User Profile Data 426

500A

User Device

500B
Host Platform 540
542
Software Application
( Child Version )
Determine Progress
User Profile Data
546
Dashboard Content
544
Output Visual Aids
512
User Device
510

600

610

700

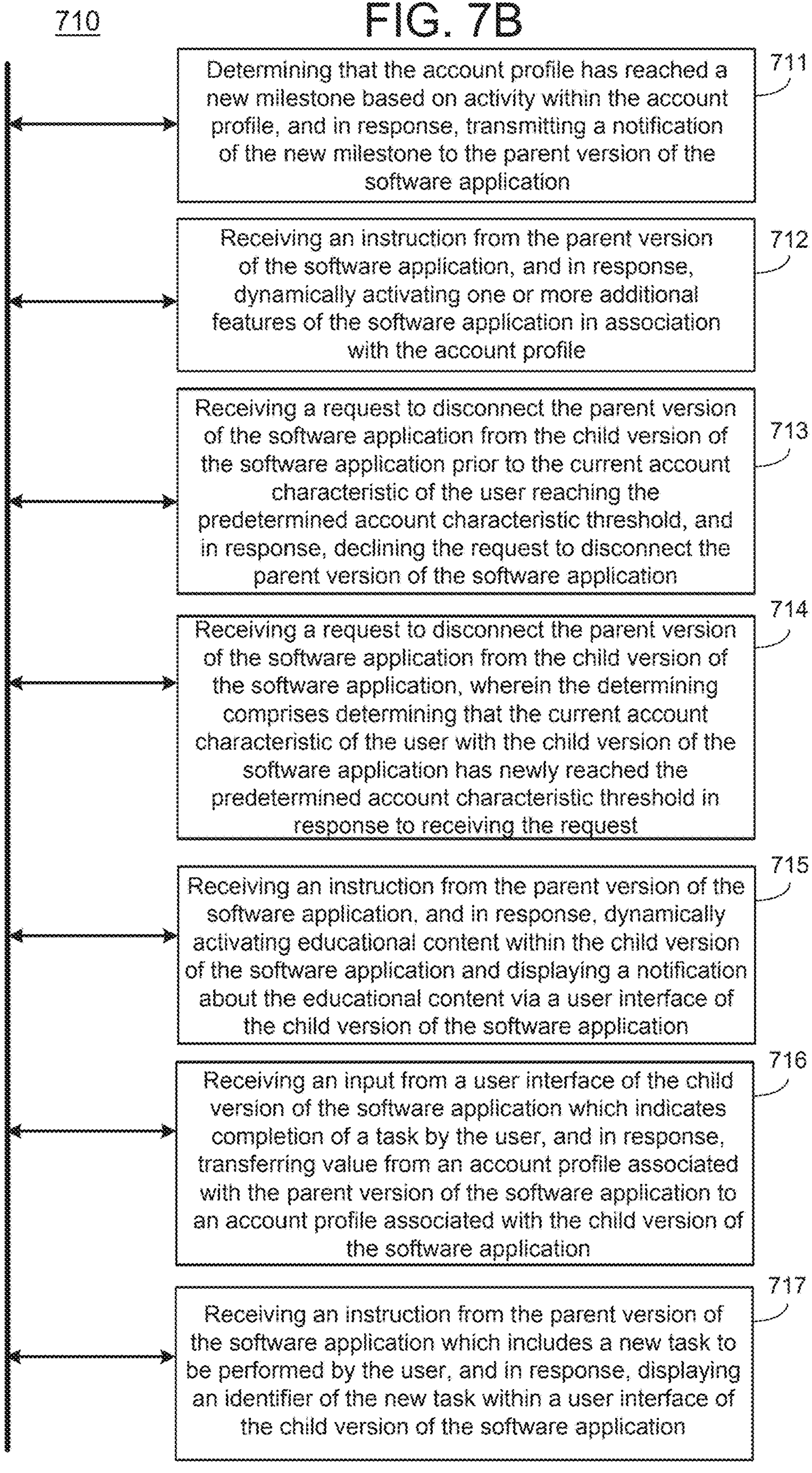
FIG. 7B
710
Determining that the account profile has reached a new milestone based on activity within the account profile, and in response, transmitting a notification of the new milestone to the parent version of the software application
711
Receiving an instruction from the parent version of the software application, and in response, dynamically activating one or more additional features of the software application in association with the account profile
712
Receiving a request to disconnect the parent version of the software application from the child version of the software application prior to the current account characteristic of the user reaching the predetermined account characteristic threshold, and in response, declining the request to disconnect the parent version of the software application
713
Receiving a request to disconnect the parent version of the software application from the child version of the software application, wherein the determining comprises determining that the current account characteristic of the user with the child version of the software application has newly reached the predetermined account characteristic threshold in response to receiving the request
714
Receiving an instruction from the parent version of the software application, and in response, dynamically activating educational content within the child version of the software application and displaying a notification about the educational content via a user interface of the child version of the software application
715
Receiving an input from a user interface of the child version of the software application which indicates completion of a task by the user, and in response, transferring value from an account profile associated with the parent version of the software application to an account profile associated with the child version of the software application
716
Receiving an instruction from the parent version of the software application which includes a new task to be performed by the user, and in response, displaying an identifier of the new task within a user interface of the child version of the software application
717

810

YOUTH APPLICATION WITH PARENTAL GUIDANCE ROLE

BACKGROUND

To help educate consumers, service providers and institutions often provide literature that the consumers can read and use for educational purposes. Examples of such literature include articles about buying a first home, saving for a college education, receiving a loan for a small business, and many other consumer interests. However, there is a lack of educational materials available for youths (e.g., under the age of 18 years, etc.). Furthermore, keeping youths engaged with the educational materials can be difficult when the content is simply a written article.

SUMMARY

One example embodiment provides an apparatus that may include a memory and a processor coupled to the memory, the processor configured to perform one or more of onboard an account with a software application hosted by a host platform and store an account characteristic within an account profile stored in the memory, receive a request for a user interface of the software application from a device, determine a current account characteristic at a time of the request based on the account characteristic of the account stored within the account profile and a system clock, and dynamically generate visual content based on the current account characteristic of the account at the time of the request and display the visual content within the user interface of the software application.

Another example embodiment provides a method that includes one or more of onboarding an account with a software application hosted by a host platform, wherein the onboarding comprises storing an account characteristic within an account profile in a storage device of the host platform, receiving a request for a user interface of the software application from a device, determining a current account characteristic at a time of the request based on the account characteristic of the account stored within the account profile and a clock of the host platform, and dynamically generating visual content based on the current account characteristic of the account at the time of the request and displaying the visual content within the user interface of the software application.

A further example embodiment provides a computer-readable medium comprising instructions, that when read by a processor, cause the processor to perform one or more of onboarding an account with a software application hosted by a host platform, wherein the onboarding comprises storing an account characteristic within an account profile in a storage device of the host platform, receiving a request for a user interface of the software application from a device, determining a current account characteristic at a time of the request based on the account characteristic of the account stored within the account profile and a clock of the host platform, and dynamically generating visual content based on the current account characteristic of the account at the time of the request and displaying the visual content within the user interface of the software application.

One example embodiment provides an apparatus that may include a memory and a processor coupled to the memory, the processor configured to perform one or more of onboard a user with a child version of a software application and store an account characteristic within an account profile of the software application, connect a parent version of the software application to the child version of the software application, wherein the processor enables the parent version of the software application to control functionality within the child version of the software application, determine that a current account characteristic of the user with the child version of the software application has reached a predetermined account characteristic threshold based on the account characteristic stored within the account profile and a system clock of a host platform of the software application, and in response, automatically disconnect the parent version of the software application from the child version of the software application.

Another example embodiment provides a method that includes one or more of onboarding a user with a child version of a software application, wherein the onboarding comprises storing an account characteristic within an account profile of the software application, connecting a parent version of the software application to the child version of the software application, wherein the connecting comprises enabling the parent version of the software application to control functionality within the child version of the software application, determining that a current account characteristic of the user with the child version of the software application has reached a predetermined account characteristic threshold based on the account characteristic stored within the account profile and a system clock of a host platform of the software application and in response, automatically disconnecting the parent version of the software application from the child version of the software application.

A further example embodiment provides a computer-readable medium comprising instructions, that when read by a processor, cause the processor to perform one or more of onboarding a user with a child version of a software application, wherein the onboarding comprises storing an account characteristic within an account profile of the software application, connecting a parent version of the software application to the child version of the software application, wherein the connecting comprises enabling the parent version of the software application to control functionality within the child version of the software application, determining that a current account characteristic of the user with the child version of the software application has reached a predetermined account characteristic threshold based on the account characteristic stored within the account profile and a system clock of a host platform of the software application and in response, automatically disconnecting the parent version of the software application from the child version of the software application.

One example embodiment provides an apparatus that may include a memory and a processor coupled to the memory, the processor configured to perform one or more of onboard an account with a software application and store a characteristic of the account within an account profile of the software application, create an avatar for the account within the software application, generate and display pages of visual aids including the avatar on a user interface of the software application as the account interacts with the pages of the visual aids, determine that the account has interacted with a visual aid and implemented training described within the visual aid based on the account interaction with the software application, and in response, change a position of the avatar within the pages of the visual aids to reflect the implemented training.

Another example embodiment provides a method that includes one or more of onboarding an account with a software application, wherein the onboarding comprises storing a characteristic of the account within an account profile of the software application, creating an avatar for the account within the software application, generating and displaying pages of visual aids including the avatar on a user interface of the software application as the account interacts with the pages of the visual aids, determining that the account has interacted with a visual aid and implemented training described within the visual aid based on the account interaction with the software application, and in response, changing a position of the avatar within the pages of the visual aids to reflect the implemented training.

A further example embodiment provides a computer-readable medium comprising instructions, that when read by a processor, cause the processor to perform one or more of onboarding an account with a software application, wherein the onboarding comprises storing a characteristic of the account within an account profile of the software application, creating an avatar for the account within the software application, generating and displaying pages of visual aids including the avatar on a user interface of the software application as the account interacts with the pages of the visual aids, determining that the account has interacted with a visual aid and implemented training described within the visual aid based on the account interaction with the software application, and in response, changing a position of the avatar within the pages of the visual aids to reflect the implemented training.

BRIEF DESCRIPTION OF THE DRAWINGS

FIG. 1 is a diagram illustrating a computing environment for hosting a youth-based software application with guardian oversight according to example embodiments.

FIGS. 2A-2D are diagrams illustrating a process of onboarding a person and outputting visual aids based on a current age of the person according to example embodiments.

FIGS. 4A-4E are diagrams illustrating a process of a guardian remotely controlling a child version of a software application according to example embodiments.

FIG. 7B is an example flow diagram according to example embodiments.

DETAILED DESCRIPTION

Figure 2A:
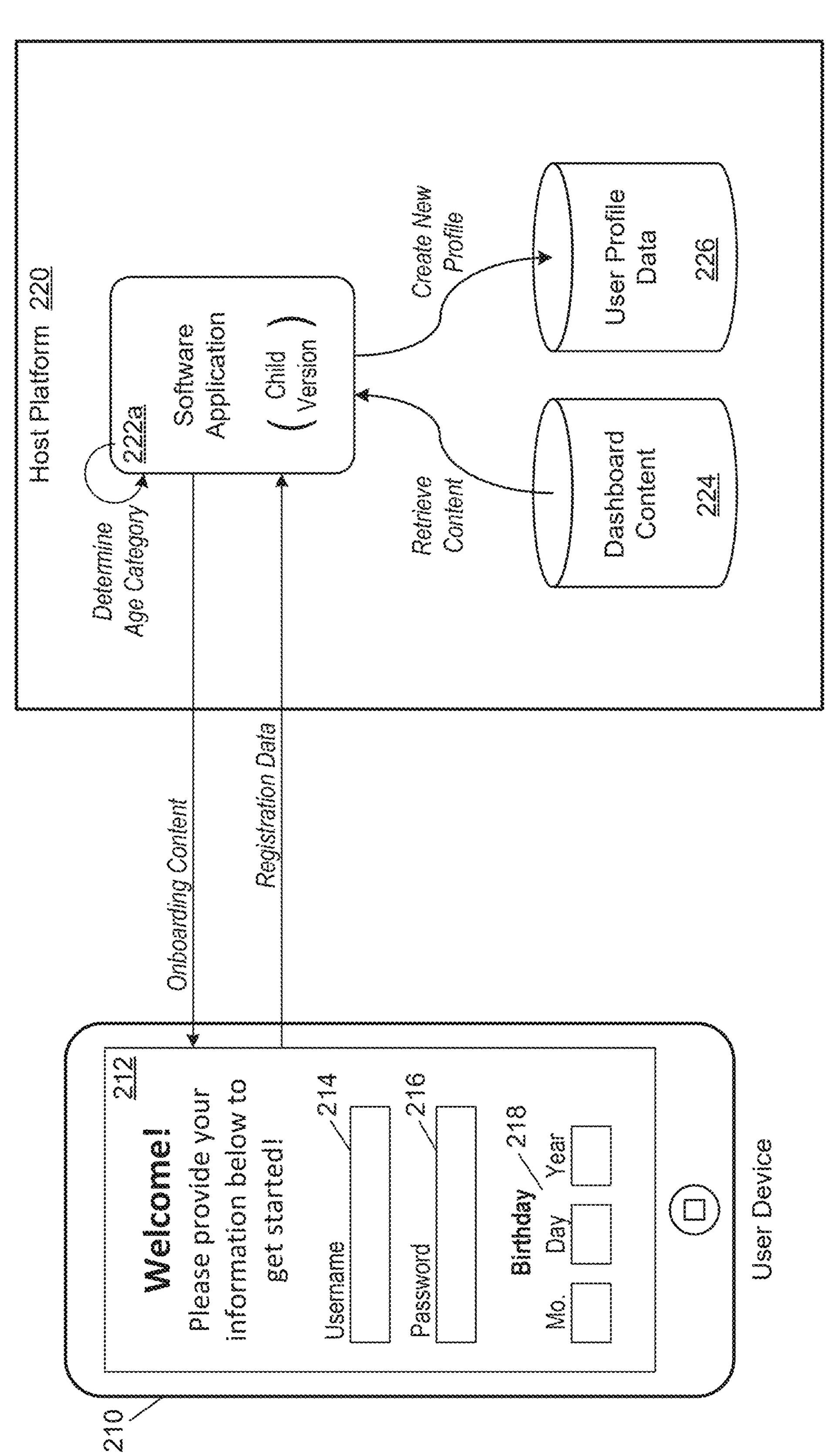

It is to be understood that although this disclosure includes a detailed description of cloud computing, implementation of the instant solution recited herein is not limited to a cloud computing environment. Rather, embodiments of the instant solution are capable of being implemented in conjunction with any other type of computing environment now known or later developed.

The example embodiments are directed to a platform that hosts a software application that is tailored toward youths (e.g., persons under the age of 18 years old, etc.) In some embodiments, the software application is directed towards financial education allowing the youth to learn about money, income, financial stability, setting goals, and the like. For example, the user can watch, interact, or otherwise engage in educational materials and content by clicking on and viewing visual aids such as videos, animations, games, and the like. As a result, a child can learn good financial habits before they turn eighteen years old.

The software application may provide content dynamically based on a current age of the user of the software application. That is, depending on the current age of the user, content within the user interface may be changed, educational materials may be changed, or the like. For example, a host of the software application may dynamically modify user interface content as the user of the software ages (e.g., activate new content, deactivate existing content, modify existing content, remove existing content, etc.) As another example, the educational materials and subject matter that is visible to the user through the user interface may change over time as the user gets older (increases in age). As an example, a youth between the ages of 10-12 years may receive content about introductory products offered by a financial institution such as a savings account, etc. As another example, a youth between the ages of 13-15 years may receive educational content about financial literature for young teens. As another example, a youth between the ages of 16-18 years may receive content about student loans, saving for college, and the like.

Tailoring content to the user's age allows a financial institution to manage risk effectively by offering age-appropriate products and services. Through this process, the host platform may provision age-relevant financial education and advisories, empowering users to make informed financial decisions. Furthermore, by providing age-appropriate content and a dynamically morphing user interface, a financial institution can enhance customer engagement and satisfaction, which can lead to increased customer loyalty and retention. Developing financial literacy and education is very important, even at an early age. Teaching children about saving money, avoiding debt, and how interest can increase their money are lessons they will carry into adulthood, allowing them to make more informed financial decisions throughout their life.

Allowing a youth to interact with a financial software application may be constrained through parental oversight (e.g., a parent or other guardian such as a teacher, a relative, or the like). One of a parent's most significant responsibilities is the safety and welfare of their child. This role constantly changes as the child grows and learns, allowing parents to slowly relinquish parental controls as a child demonstrates sufficient maturity at different stages of development. In recent years, the parental role has expanded into new areas, including computers, the internet, mobile phones, and social media. Parents must now understand these technologies well enough to determine which ones are appropriate for their children and which are not, as well as which features are appropriate and how much monitoring is necessary. For example, social media and texting include constant content updates requiring much more interactive parental monitoring. At the same time, other applications have fixed functionality or can be configured to enable and disable available features.

According to various embodiments, the youth software application may be remotely monitored and controlled by a guardian through a separate version of the software application. The guardian version of the software application may be connected to the child version enabling the guardian to monitor the child's activity and control functionality within the child's version of the software application. Through this connection, the guardian may monitor the activity of the youth, set tasks, savings goals, chores, and the like, for the child to perform, pay the child for completing tasks (such as chores), request the child to watch educational materials, send the child celebratory notifications when they achieve a goal, and the like.

Traditional educational materials offered by financial institutions can require understanding a great deal of financial terms and language. Furthermore, many educational materials provided written content/typed content for the user to read and understand on their own. However, this type of content may struggle to keep the attention of a youth. In the example embodiments, the child version of the software application may provide training materials that are fun, engaging, and crucial to ensure that users will use them when they are confused and not simply quit using the application.

According to various embodiments, the child version of the software application may include gamification of the tutorial/training processes which can be more effective in keeping the youth engaged and making the experience something they comprehend better. The instant solution uses profile information received from a user during registration of a software application to determine the user's age and then displays aids within the application based on the user's age and interaction with the pages of the application. The environment within the user interface may be a gamified environment. Here, the user may generate an avatar that represents the user as the move through the game. For example, upon determining that the user has viewed and interacted with a visual aid and implemented training, the software may change a position/location of the avatar within the game to reflect that the user has read and/or implemented the training in some way based on monitored user activity within the child version of the software application.

FIG. 1 illustrates a computing environment 100 for hosting a youth-based software application with guardian oversight according to example embodiments. Referring to FIG. 1, a host platform 120, such as a cloud platform, web server, etc., may host a software application that includes separate versions including a child version of the software application 122*a* and a guardian version of the software application 122*b*. In this example, a youth (e.g., a user/person that is under the age of 18 years, etc.) may access the child version of the software application 122*a* with a child's user device 110 by connecting the child's user device 110 to the host platform 120 over a computer network. This may include downloading and installing a front-end of the child version of the software application 122*a* on the child's user device 110, accessing the child version of the software application 122*a* via a browser such as a mobile browser, web browser, or the like.

Likewise, a guardian of the youth (e.g., a parent, teacher, older sibling, or other guardian of the child, etc. that is 18 years or older) may access the guardian version of the software application 122*b* by connecting a guardian's user device 130 to the host platform 120 over a computer network. This may include downloading and installing a front-end of the guardian version of the software application 122*b* on the guardian's user device 130, accessing the guardian version of the software application 122*b* via a browser such as a mobile browser, web browser, or the like. The host platform 120 may require the child version of the software application 122*a* to be connected to a guardian version of the software application 122*b* if the youth is under a certain age, for example, 15 years old, however, embodiments are not limited thereto, and the connections may not be required. In this example, the child's user device 110 and the guardian's user device 130 may be different devices that are owned and operated by different users/persons such as a child and a parent of the child, or the like. Examples of a user device include a mobile device, a computer, a laptop, a desktop computer, or the like.

The youth may be onboarded (e.g., registered, etc.) with the child version of the software application 122*a* on the child's user device 110 and the guardian may be onboarded with the guardian version of the software application 122*b* on the guardian's user device 130. During the onboarding, the youth may provide identifying information about themselves including a name, email address, phone number, a current age of the youth, payment account information of a payment account (if any) that the youth has established with a financial institution associated with the host platform 120, and the like. The payment account information may be stored in a financial institution account data store 124. From the information provided during the onboarding process, the child version of the software application 122*a* may build a user profile for the user including the onboarded information (such as age) and store it in the user profile data store 126. The user profile may also include a timestamp indicating when the user provided their age, thereby enabling the child version of the software application 122*a* to subsequently determine how old the user is at a later time.

Furthermore, the youth may also submit an identifier of the user device 130 (of the guardian) to the child version of the software application 122*a* during the onboarding process. The identifier of the guardian device may include a device ID of the guardian's user device 130, an application ID of the guardian's instance of the guardian version of the software application 122*b*, a username of the guardian's account, an email address of the guardian, a phone number of the guardian, or the like, which the guardian previously used to onboard with the guardian version of the software application 122*b*. In response, the host platform 120 may link the child version of the software application 122*a* to the guardian version of the software application 122*b* and store the link within the user profile of the youth.

According to various embodiments, the host platform 120 may establish a connection 123 between the child version of the software application 122*a* and the guardian version of the software application 122*b* which provides the guardian version of the software application 122*b* with operational control over the child version of the software application 122*a*. The connection 123 may be integrated into the child version of the software application 122*a* enabling the guardian version of the software application 122*a* to monitor behavior/activity of the youth. Through this connection 123, and as further explained herein, the guardian (via the guardian version of the software application 122*b*) is able to control what functions the youth can use, what user interface content the youth can view, what educational resources the youth is able to learn from, and the like. It also provides the guardian with the ability to set tasks (e.g., chores, etc.) and send payments or other assets to a financial account of the youth which may be registered.

During operation, the youth may view learning content 114 on a user interface 112 of the user device 110 and other data that is tailored towards educating a youth on financial goals. The learning content 114 may be dynamically updated based on an age of the youth. For example, a youth between the ages of 11-12 years may be provided with different information than a youth between the ages of 14-15 years, etc. The content that is shown and provided to the youth may be controlled by control content 134 displayed on a user interface 132 of the guardian's user device 130 by the guardian version of the software application **122*b*. The guardian may be provided with updates on the content that the youth has viewed, the tasks the youth has completed, and any other actions taken by the youth with the child version of the software application 122*a*. The content that is provided may be pulled from a dashboard content data store 128**.

In one embodiment, the viewing of a visual aid or any other action may be any interaction with the visual aid.

In one embodiment, the system introduces an educational game with artificial intelligence monitoring. The system includes an application designed as an educational game that teaches financial literacy to children. The core of the application is a series of engaging, age-appropriate games and challenges centered around key financial concepts such as earning, saving, spending, and investing. As the child plays, they earn virtual currency and rewards for completing tasks, making smart financial decisions, and progressing through levels. The unique aspect of the application is the incorporation of Artificial Intelligence (AI), which actively monitors the child's progress and understanding of financial concepts. The AI adapts the game's difficulty and the complexity of financial tasks based on the child's age, performance, and learning curve, ensuring the educational content is always challenging yet achievable. Guardians, such as parents or teachers, play a crucial role in the system through a separate application version. Guardians set real-world financial goals for the child, like saving for a new toy or managing a small weekly budget. The goals are integrated into the game, providing practical applications of the concepts learned. Additionally, guardians have access to detailed reports and analytics provided by the AI, enabling them to track the child's progress and understanding of financial matters. As the child grows older and demonstrates a deeper understanding and responsible financial behavior, the AI system gradually reduces the level of guardian oversight. The transition is carefully managed to ensure that the child is ready for more financial independence. Once the child reaches a predetermined age or meets certain milestones the AI sets (based on its analysis of the child's financial literacy and decision-making skills), the application shifts to a more autonomous mode. In this mode, the child can make more independent financial decisions within the game, and the guardian's role shifts from direct oversight to advisory. The system's goal is to provide a seamless transition for the child from learning basic financial concepts in a fun and engaging way to becoming a financially literate and responsible individual. AI ensures that this transition is based on the child's actual learning and maturity level rather than just their physical age, making it a highly personalized and effective educational tool.

In one embodiment, the system uses an augmented reality (AR) application to teach children financial basics. The system includes an application that offers an immersive and interactive learning environment where financial concepts are taught through real-world scenarios overlaid with digital information. The application uses the camera and display of a smartphone or tablet to project virtual elements, such as graphical displays of budgets, savings goals, and investment scenarios, into the physical environment. Children engage with a variety of AR experiences that simulate real-life financial situations. For example, they might point their device at a piggy bank, displaying an interactive graph showing savings growth over time. Or, while shopping with a parent, they may scan items to learn about budgeting and the concept of needs versus wants. The activities are fun and engaging, helping children understand and apply financial concepts in everyday contexts. Guardians play a key role in customizing and controlling the experience. Through a guardian-specific version of the application, they set tasks or challenges for their children. The tasks include real-world activities like managing a small weekly allowance, planning a budget for a family outing, and understanding the cost of household items. The AR application helps to visualize the tasks, making the learning process more tangible and relatable for the child. As the child interacts with the application, their progress and understanding of financial concepts are tracked. The application adapts the complexity of scenarios and information based on the child's age, learning progress, and interactions. Guardians receive updates and insights into the child's learning journey, allowing them to tailor future tasks and discussions about money. A key feature of the system is the gradual transition to greater financial independence as the child matures. Initially, the guardian has substantial control over the content and complexity of financial scenarios presented in the application. However, as the child demonstrates increased understanding and responsible financial behavior, the application's algorithms allow more complex and independent interactions. This progression is seamless, with the guardian's oversight decreasing in a controlled manner until the child reaches a certain age or demonstrates a high level of financial literacy, at which point they gain full autonomy within the application.

In one embodiment, the system leverages a voice-assisted financial advisor for children to teach them financial basics. The interactive application is designed to guide children through various aspects of financial education using a conversational AI assistant, which responds to voice commands and queries, making the learning process engaging and interactive. The core of the system is a voice-activated AI that functions like a personal financial coach for children. It explains complex financial concepts in simple, age-appropriate language, answer questions about money management, and provide scenarios for the child to solve, such as budgeting for a week's worth of expenses or understanding the basics of saving and interest. This AI assistant adapts its responses and the complexity of its explanations based on the child's age, previous interactions, and demonstrated understanding of financial topics. Guardians access a separate interface to set specific educational goals and parameters. For instance, a guardian might want the AI to focus on teaching the child about saving for long-term goals or understanding the value of money in different contexts. Guardians also track the child's progress through the application, receiving regular updates on the topics covered and the child's responses, allowing them to gauge their understanding and progress. The AI gradually transitions from a direct educational guide to an advisory and less intrusive presence. Initially, when the child is younger, the AI takes an active role in teaching and guiding the child through various financial concepts and decisions. However, as the child ages and their understanding deepens, the AI shifts to a more supportive role, offering advice when asked and allowing the child more independence in financial decision-making. The transition is seamless and is driven by sophisticated algorithms that assess the child's growing competence and confidence in handling financial matters. Once the child reaches a predetermined age or demonstrates a certain level of financial literacy, the guardian's oversight via the application is phased out. The AI continues to support the child, now a young adult, but with a focus on more advanced topics like credit scores, investment strategies, and budget planning for larger life goals. The application, thus, evolves from being a learning tool to an advisory platform, providing ongoing support as the user's financial knowledge and needs grow.

In one embodiment, the system utilizes a virtual reality (VR) simulation to teach children how to manage their finances. The system immerses the child in a fully interactive virtual world where they can learn about and manage finances. The application uses VR technology to create a simulated environment where financial concepts are taught and experienced in a controlled, engaging, and interactive manner. Children are given a simulated personal economy to manage in the virtual world. They earn a virtual income through tasks or challenges linked to real-world accomplishments or chores. They manage this income, facing decisions about spending, saving, and investing within the VR environment. The simulation includes realistic scenarios like paying for virtual utilities, buying groceries, and investing in simulated stocks or businesses. The financial simulation grows more complex as the child ages. Younger children start with simple tasks like saving for a desired virtual item, while older children are introduced to more advanced concepts like credit scores, loans, and budgeting for larger goals. The progression is carefully crafted to match the child's cognitive development and financial understanding. Guardians use a separate module to set parameters within the simulation, tailor tasks to the child's real-life experiences, and monitor progress. For example, a guardian might set a task for the child to budget a virtual family holiday, teaching them about the costs involved and the importance of saving. Initially, the guardian has significant control over the scenarios and tasks presented in the VR simulation. However, as the child demonstrates understanding and responsible financial behavior, the simulation automatically adjusts to offer more complex challenges and less guided decision-making. This transition is based on algorithms that assess the child's interactions, decisions, and overall progress in the simulation. Upon reaching a certain age or a set level of financial literacy, the child's VR experience shifts to reflect their new level of independence. The guardian's oversight is reduced, and the child is presented with a more advanced and less restrictive financial management environment. They are now faced with scenarios that require more nuanced decision-making and understanding, such as managing a virtual mortgage or investing in a diversified portfolio.

In one embodiment, the system teaches children financial literacy through an application where they can earn cryptocurrency by completing educational modules. The system teaches financial literacy to children by incorporating the principles of cryptocurrency and blockchain technology. The application allows children to earn, save, and spend virtual cryptocurrency through educational modules and real-world tasks, all underpinned by a secure and transparent blockchain framework. Children earn cryptocurrency by completing various financial education modules, quizzes, and real-world tasks set by their guardians, such as saving a portion of their real-life allowance or completing household chores. The virtual currency is stored in a secure digital wallet within the app, which the child can manage. Blockchain technology ensures transparency and security, allowing the child and the guardian to track real-time earnings, savings, and expenditures. The application also features a controlled marketplace where the virtual currency can be used. The marketplace includes various items or privileges children can 'purchase,' teaching them the value of money and the consequences of spending. The marketplace is designed to be age-appropriate and can be customized by the guardian. Guardians have substantial control over the application's functionalities. They can set tasks, approve transactions, and monitor the child's financial activities. This oversight ensures that the child's interaction with the application remains educational and safe. Moreover, guardians can use the application to discuss and demonstrate important financial concepts, such as the importance of saving, the concept of earning, and the basics of budgeting. As children grow older and demonstrate responsible financial behavior and understanding, the application gradually grants them more autonomy over their digital wallets. This transition is carefully calibrated to match the child's maturity and financial literacy level. The blockchain's immutable record-keeping provides a transparent history of the child's financial decisions and learning progress. Once the child reaches a predetermined age or meets specific milestones in financial literacy, as assessed by the application's algorithms, the guardian's access to and control over the child's account is automatically reduced. The application transitions from a learning and monitoring tool to a more independent financial management platform for the child. At this stage, the application introduces more advanced financial concepts such as investment options, interest accumulation, and even basic elements of cryptocurrency trading, still within a safe and controlled environment.

In one embodiment, the system uses a software application to provide an educational financial management experience for youths under the supervision of a guardian. The system onboards a user with a child version of a software application. The onboarding process involves the youth user providing personal details such as name, email, phone number, current age, and any existing payment account information. This information is stored within a user profile in the user profile data store. Additionally, the system connects a parent or guardian version of the software application to the child version. This connection is established through the host platform, a cloud platform, or a web server. The guardian version, accessed by the guardian on a separate user device, has operational control over the child version of the software application. Control includes managing what functions the youth can use, what user interface content the youth can view, and which educational resources are accessible. The guardian can also set tasks and send payments or other assets to the youth's financial account. The system dynamically updates the learning content based on the youth's age. The educational content, tailored for various age groups, is stored in a dashboard content data store, and displayed on the youth's user interface. Through their user interface, the guardian monitors and updates the content, receives notifications about the youth's interactions with the application, and oversees the completion of tasks. Furthermore, the system determines when the user's current age with the child version of the software application has reached a predetermined age threshold. The determination is based on the age stored in the user profile and the system clock of the host platform. Upon reaching the threshold age, the system automatically disconnects the parent version of the software application from the child version. As a result, the child's application transitions to a full-featured adult version, independent of the guardian's oversight.

FIGS. 2A-2D illustrate a process of onboarding a person and outputting visual aids based on an age of the person according to example embodiments. For example, FIG. 2A illustrates a process 200A of a youth being onboarded with a child version of a software application 222*a* hosted by a host platform 220. In this example, the child version of the software application 222*a* may display fields 214, 216, 218, etc. on a user interface 212 of a user device 210 of the youth. Through this process, the youth may enter information into the fields and submit it to the child version of the software application 222*a*. In this example, the field 218 enables a user to provide their current age.

In response to receiving the registration data from the user device 210, the child version of the software application 222*a* may create a user profile for the youth and store the user profile within a user profile data store 226. The user profile may include the age of the youth at the time of registration, the data of the registration or other timestamp, contact information of the youth, financial account information of the youth, guardian information of the youth, and the like. In response, the child version of the software application 222*a* may display visual content on the user interface 212 of the user device 210 based on a current age of the youth. The dashboard content may be retrieved from a dashboard content data store 224.

Figure 2B:
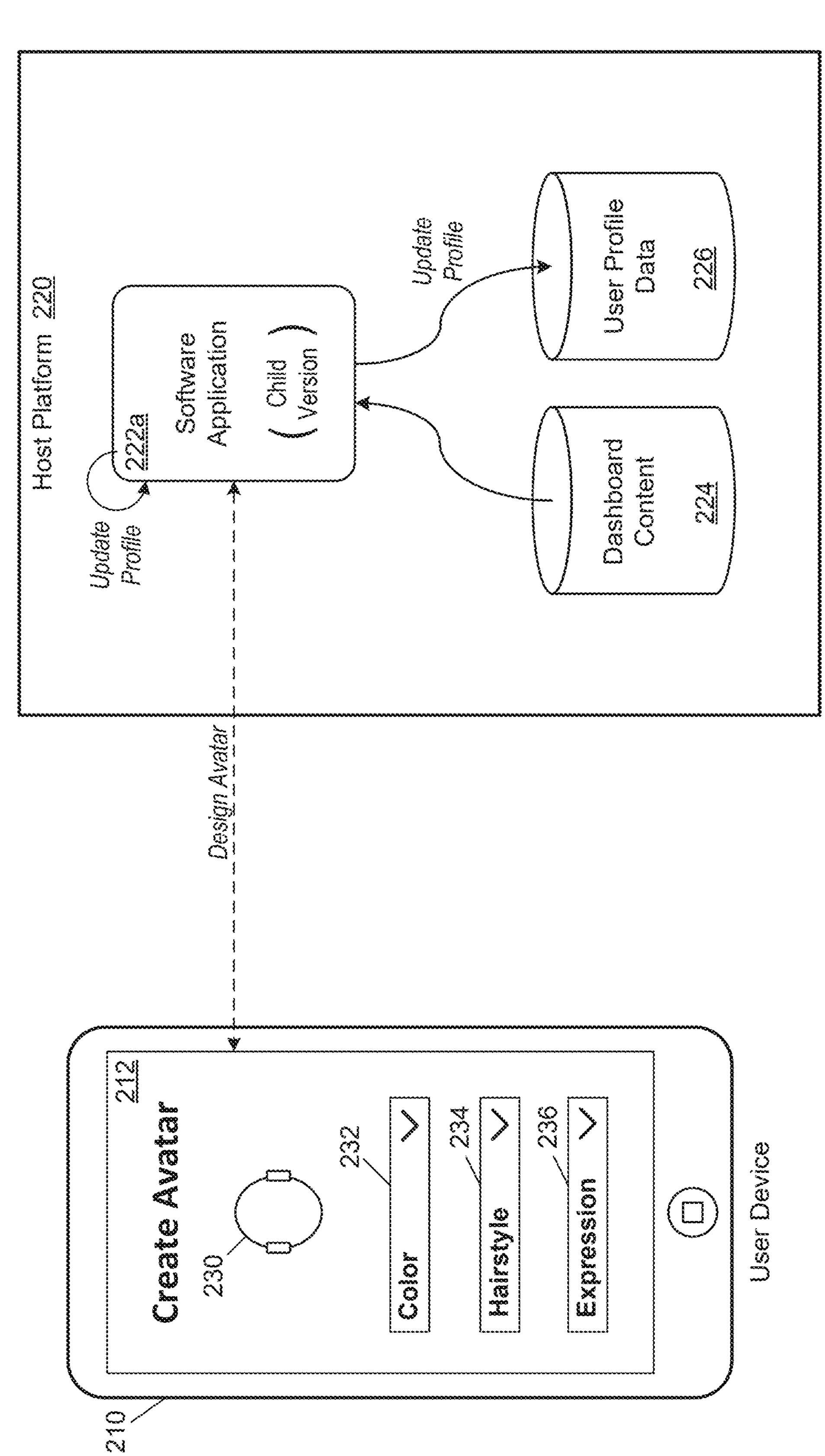

During the onboarding process, the youth may also design a friendly avatar that may represent them in an animated game or other educational materials that are displayed on the user interface 212 of the user device 210 by the child version of the software application 222*a*. For example, FIG. 2B illustrates a process 200B of a user creating an avatar 230 via the child version of the software application 222*a*. During this process, the youth may enter attribute values into fields 232, 234, 236, etc. to define how the avatar 230 appears within visual aids that are output by the child version of the software application 222*a*. The design of the avatar 230 may be stored within the dashboard content data store 224. Furthermore, the avatar 230 may also be stored within the user profile of the user within the user profile data store 226.

In one embodiment, the user may be an account and the age of the user may be an account characteristic of the account.

Figure 2C:
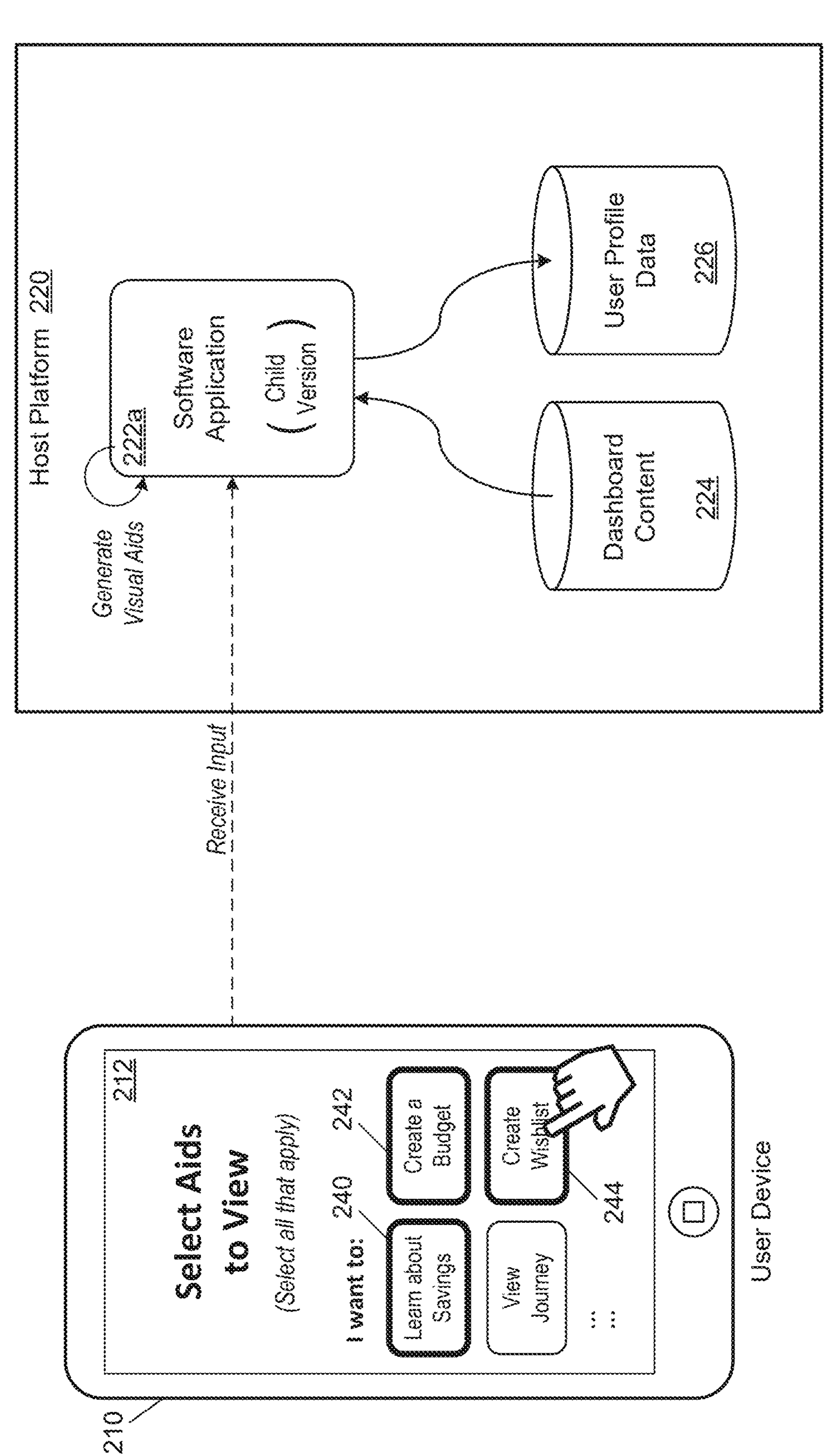

FIG. 2C illustrates a process 200C of the youth choosing visual aids that the youth can learn from while interacting with the child version of the software application 222*a* according to various embodiments. Referring to FIG. 2C, the child version of the software application 222*a* may display a list of identifiers of educational materials (e.g., pages of content) on the user interface 212 of the user device 210 enabling the user to choose which educational materials they wish to view and interact. In this example, the user has selected a visual aid 240, a visual aid 242, and a visual aid 244 for viewing.

According to various embodiments, the visual aids may be interactive, animated, gamified, or the like, thereby engaging the youth in a manner that the youth is accustomed and enjoys rather than reading an article of content, etc. The selections made by the user on the user interface 212 may be provided to the child version of the software application 222*a* thereby enabling the child version of the software application 222*a*. In response, the child version of the software application 222*a* may output the visual aids, for example, based on a predefined order, a custom order, or the like. In some embodiments, the youth may change the order in which the visual aids/pages of the educational content are displayed by the child version of the software application 222*a*.

FIG. 2D illustrates a view 200D of visual aids of the child version of the software application. In this example, a visual aid 250 includes learning/educational content about savings that a youth can learn from to understand the benefit of putting money into a savings account. Here, the youth's avatar 230 may be displayed within the visual aid 250 thereby providing the youth with an engaging experience. A visual aid 260 includes interactive content that enables a user to set savings goals for different items such as items they wish to purchase. In this case, the user can interact with the visual aid to establish new goals/items for which they wish to save and also to apply money from their financial account to the goals.

Furthermore, a visual aid 270 includes a gamified learning experience which also includes the avatar 230. In this example, the youth is travelling on an educational journey in which they move along a gameboard each time a new educational material is read and/or implemented. The implementation of the training may be detected by the child version of the software application 222*a* based on the user's interaction with the visual aids, the user's interaction with their financial account, remote instructions from a guardian, or the like. The gameboard includes the avatar 230 of the user which represents the user's position in the journey. When the user completes materials, implements training, sets tasks, etc., the child version of the software application 222*a* may move the avatar 230 to different positions within the gameboard, as further described in the examples of FIG. 5A-5D.

According to various embodiments, the youth (or the guardian) may also change the order in which the visual aids are displayed/output by the child version of the software application 222*a*. The user interface 212 may provide the youth with options to choose the order in which the visual aids are shown. As another example, a guardian may change the order in which the visual aids are displayed. For example, the guardian may request certain visual aids to be shown to the youth before other visual aids. As an example, the guardian may request that the youth complete a training on income before the youth watches an interactive visual aid on setting tasks for the purpose of receiving income.

In one embodiment, the system uses augmented reality to create an interactive learning environment. The system leverages an application that overlays an interactive, educational AR world onto their real-world surroundings. The user has an avatar in this AR world, which progresses through different stages or checkpoints as the user completes various educational modules or visual aids. For instance, a user learning about history might see their living room transform into historical scenes relevant to the lesson, with the avatar navigating through these scenes. As the user completes tasks or answers quiz questions correctly, the avatar moves to new locations in the AR world, each representing a different historical era or event. The application uses the camera and sensors in a smartphone or tablet, or AR glasses. Interaction with the AR world can be through touch (on a smartphone or tablet screen), gesture (using hand-tracking technology in AR glasses), or even voice commands. The system adapts to the user's environment. For instance, if a user is in a small room, the AR experience can be scaled down to fit the available space. Conversely, in a larger area, like a school playground, the experience can expand, offering a larger and more immersive learning landscape. The AR enhances educational subjects with visual and spatial learning, such as geography, history, and science.

In one embodiment, the system uses a storytelling application that embarks on educational adventures. The system offers an innovative and immersive educational experience through a storytelling application that uses voice recognition technology. The user has an avatar that progresses through a story, unlocking new chapters and adventures as they complete educational tasks and visual aids. Users engage with the story by speaking commands or answering questions using their voices. The voice activation feature makes the learning experience more interactive and helps develop language skills, articulation, and confidence in public speaking. For instance, in a language learning module, the story might progress only when the user correctly pronounces certain words or phrases or answers questions in the language they are learning. The narrative is tailored to various educational subjects. In a science-focused story, the user might be on a quest to solve environmental challenges, with each task representing a different scientific concept or experiment. In a history-themed adventure, the avatar can travel through different time periods, with the user needing to answer historical questions or solve puzzles based on historical events to move forward. The application recognizes a wide range of vocal pitches and accents, making it inclusive and accessible. The software adapts to the user's speech patterns and learning pace. For younger users or those developing their language skills, the application can provide immediate feedback on pronunciation and suggest corrections, turning the learning process into an engaging conversation with the application. Users can earn points or rewards for correct answers, motivating them to engage more deeply with the content. Additionally, the system includes a multiplayer mode, where users can interact with friends or classmates in the story, working together to solve challenges or compete in educational tasks.

In one embodiment, the system is designed for multiplayer interaction on educational quests. The system includes an application that creates a virtual world where users, each represented by an avatar, can interact with one another. The world is structured around various educational quests that require collaboration, problem-solving, and knowledge application. Users join the virtual world and can form teams or groups to embark on quests. The quests are designed as interactive educational challenges, focusing on various subjects like math puzzles, science experiments, or language tasks. For example, a quest might involve solving a complex math problem that requires each team member to solve different parts of it or a science quest where users conduct virtual experiments collaboratively. The system adapts to different age groups and educational levels. For younger users, the quests are more game-like and story-driven, while for older students, they are more complex and problem-focused. The application also adapts the difficulty of quests based on the users' performance, ensuring a continuously challenging and engaging learning experience. Users communicate via text or voice chat, discussing strategies and sharing knowledge to complete the quests. The application includes leaderboards, rewards, and recognition for completing quests, adding a competitive edge that motivates users. The educational content in the quests is interactive and requires active participation and problem-solving. The multiplayer aspect develops soft skills like teamwork, communication, and leadership.

In one embodiment, the system leverages a virtual reality (VR) application for educational learning. The application transports users into a fully realized three-dimensional (3D) educational environment where they can interact with various virtual skill labs. Each lab is dedicated to a specific subject area, such as physics, biology, or mathematics, offering a range of interactive, hands-on learning experiences. The user has an avatar, which acts as their virtual self within the VR world. As users engage with different learning modules and complete tasks or experiments within the labs, their avatar advances through levels or stages, reflecting their progress and achievements. The progress can be visualized in the VR space, for instance, through virtual trophies, progress bars, or unlocking new, more advanced labs. The VR Skill Labs are designed to simulate real-life scenarios and experiments, offering a safe and controlled environment for users to explore and learn. For instance, in a chemistry lab, users can conduct virtual chemical experiments, combining different elements and observing reactions without any real-world risk. In a physics lab, they can interact with simulations of physical forces and phenomena, visualizing concepts that may be difficult or impossible to observe in a real classroom. The system interaction is intuitive and lifelike, utilizing VR controllers and hand-tracking technology. This allows users to manipulate objects, conduct experiments, and navigate through the labs in a natural and engaging way. The VR setting also enables complex visualizations of abstract concepts, like visualizing atomic structures in 3D or walking through a virtual heart to understand its workings. The system adapts to individual learning styles and paces. The VR application tracks the user's interactions and progress, offering personalized guidance, adjusting the difficulty of tasks, or suggesting new areas of focus, ensuring that each user's learning experience is tailored to their needs, maximizing educational effectiveness. Additionally, users can join the same lab from different locations, working together on experiments or projects.

In one embodiment, the system uses AI to personalize a learning adventure. The system incorporates AI to customize the learning experience for each user. An application featuring an interactive, game-like environment is enhanced with AI to tailor educational content and challenges based on the user's individual learning style, progress, and interests. An avatar represents the user within the virtual world. The avatar's journey through the world is not linear but dynamically alters based on the user's interactions with the educational content. As the user engages with different learning modules, the AI analyzes their responses, understanding their strengths, weaknesses, and preferences. Based on this analysis, the AT adjusts the storyline, challenges, and educational tasks in real time to better suit the user's learning needs. For example, if the AT detects that a user excels in mathematics but struggles with language arts, it might create a storyline where the avatar embarks on a quest requiring more language-based challenges, turning the user's weaker area into a fun and engaging adventure. Conversely, for a user interested in science, the AT might generate a science-fiction-themed adventure filled with relevant scientific puzzles and experiments. The AT adapts the difficulty level of tasks and the pace of the educational journey. When a user is breezing through certain topics, the challenges become more complex, ensuring continuous learning and engagement. When a user is struggling, the AT provides additional resources, hints, or simplifies tasks to keep the learning process enjoyable and stress-free. The system provides real-time feedback and encouragement on the user's performance and provides motivational messages and rewards, such as virtual trophies or new abilities for their avatar. The system personalizes the visual and interactive elements, changing the environment, characters, and visual style of the game to match the user's preferences. For instance, a user interested in art might find their avatar exploring a world filled with famous paintings and art-related challenges. The system incorporates adaptive learning strategies, such as spaced repetition for topics that need more reinforcement or introducing varied learning formats (like videos, quizzes, and interactive simulations) based on the user's engagement levels. The system supports teachers by providing detailed insights into each student's progress and learning style, helping to tailor classroom activities and individual support.

In one embodiment, the system navigates a user through visual aids with an avatar, moving the avatar when a visual aid has been viewed. The system engages youths in financial education through an interactive and personalized digital experience. The system onboards a user, typically a youth, onto a specialized software application. The onboarding process involves collecting essential user data, such as age, which is then securely stored within a user profile in the software application. The user's age gathered through an intuitive user interface on the user device, plays a critical role in customizing the content and experience to be age-appropriate and engaging. The system creates a personalized avatar for the user within the software application. The avatar, designed by the youth during the onboarding process, is more than a digital representation; it serves as a virtual companion in the educational journey. The youth inputs attributes for the avatar, like appearance and characteristics, into designated fields on the user interface. These details are stored both within the user's profile and a separate dashboard content data store for easy retrieval and modification. The system dynamically generates and displays pages of visual aids, including the user-created avatar, on the user interface. The visual aids are not static; they are interactive, often gamified, and tailored to the youth's preferences and age. The visual aids cover various financial topics, from savings to goal setting, and are designed to be both educational and engaging. The system tracks user interaction with the visual aids, determining when a visual aid has been viewed and the associated training implemented. In response to the user's engagement and progress, the system changes the position of the avatar within the visual aids, reflecting the user's advancement and learning. For example, as the youth completes different educational modules or achieves set financial goals, the avatar moves to different positions within a gamified learning environment, such as progressing along a gameboard. The movement is not just a visual change; it's a reinforcement of the learning and achievements of the youth. The system allows for customization of the order in which visual aids are displayed. This feature can be controlled either by the youth or by a guardian, enabling a tailored educational pathway. For instance, a guardian might prioritize certain financial topics before others, ensuring a structured learning process.

Figure 3A:
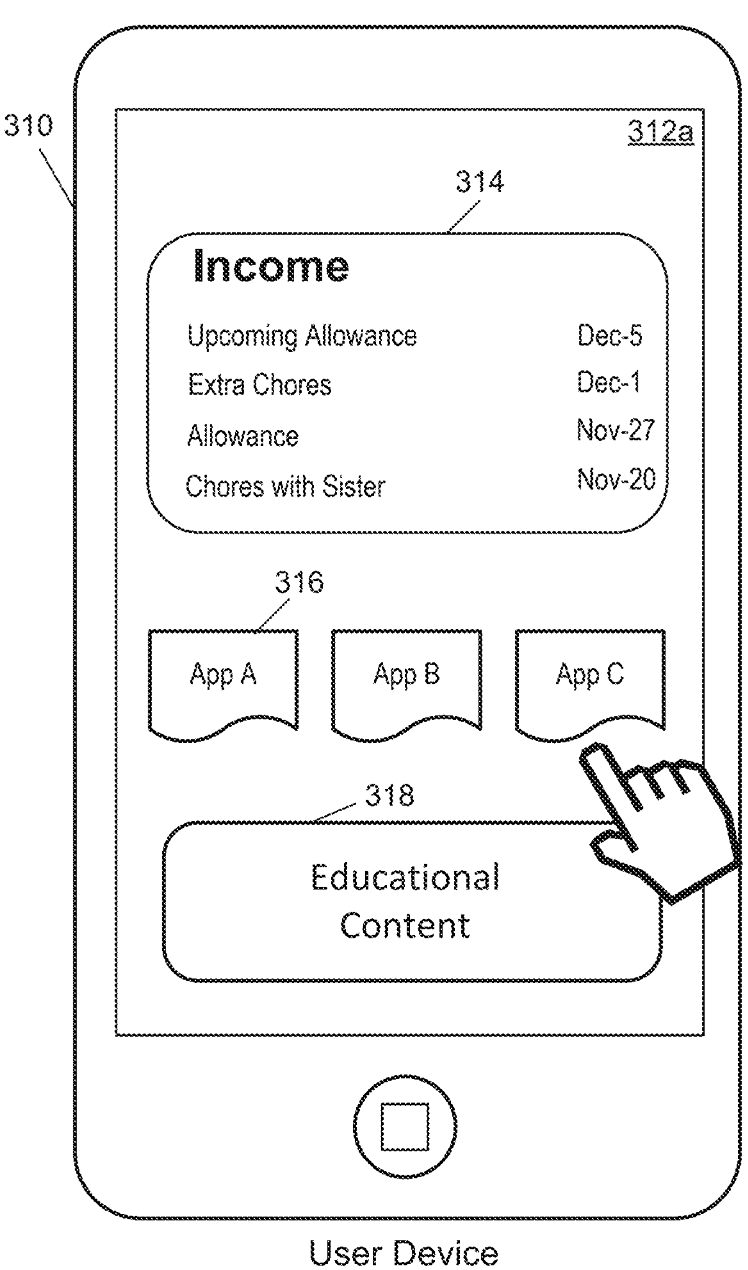
FIGS. 3A-3C are diagrams illustrating a process of morphing content output by a user interface of a software application as a user of the software application increases in age according to example embodiments.
Figure 3B:
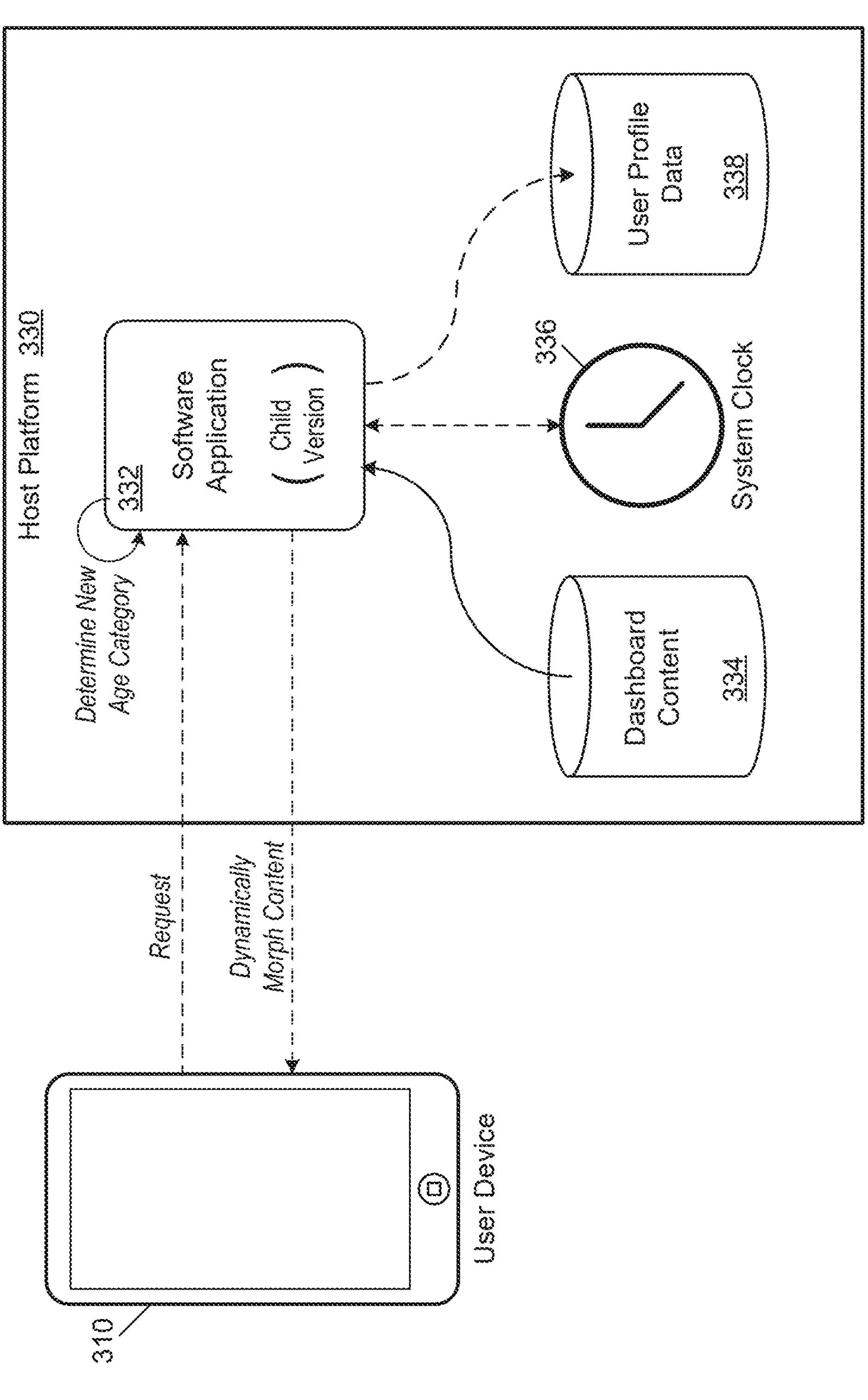
Figure 3C:
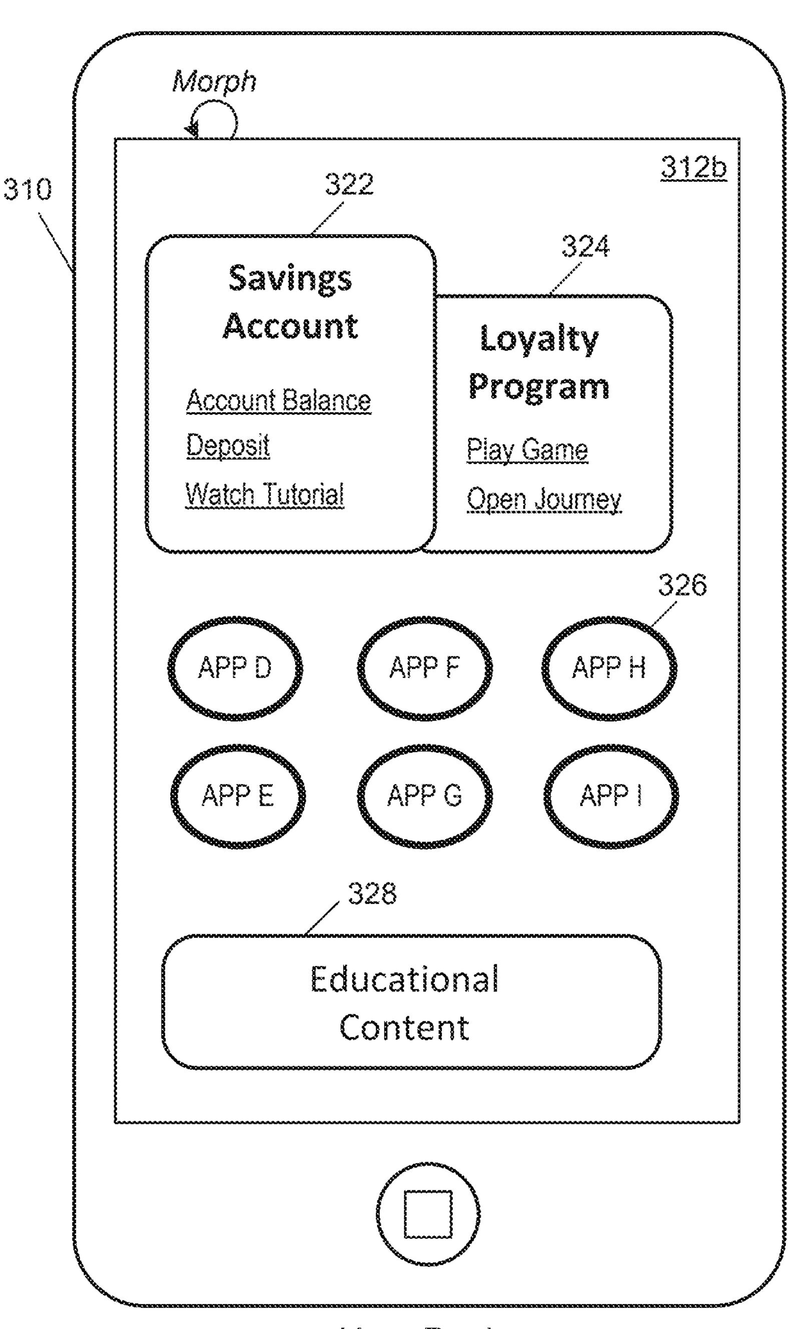

FIGS. 3A-3C illustrate a process of morphing content output by a user interface of a software application as a user of the software application increases in age according to example embodiments. According to various embodiments, the child version of the software application described herein can dynamically change the content that is output on the user interface of the youth's device based on a current age of the youth. As an example, youths between the ages of 11-12 years may receive user interface content that is related to learning about how to set up a savings account, income, etc. Meanwhile, youths between the ages of 13-15 years may receive user interface content that enables the youth to send money to others, watch educational materials specific for teenagers, and the like. As another example, youths between the ages of 16-18 years old may receive content about saving for college, how to apply for a student loan, and the like.

The user interface of the child version of the software application may also be adapted based on a current age of the youth. For instance, when the youth is younger (e.g., under the age of 13 years, etc.), the youth might prefer a more interactive and visually engaging interface. Tailoring content to the user's age allows the application to manage risk effectively by offering age-appropriate products and services. It can also facilitate the provision of age-relevant financial education and advisories, empowering users to make informed financial decisions. By providing age-appropriate content and user interface, banks and other financial institutions can educate younger customers and enhance customer engagement and satisfaction, which can lead to increased customer loyalty and retention. Developing financial literacy and education is very important, even at an early age. Teaching children about saving money, avoiding debt, and how interest can increase their money are lessons they will carry into adulthood, allowing them to make more informed financial decisions throughout their lives.

For example, FIG. 3A illustrates a view 300A of a user interface 312*a* output by the child version of the software application on a user device 310 of a registered/onboarded youth. Here, the user interface 312*a* includes a window 314 of content directed to income of the youth. In addition, the user interface 312*a* includes applications with icons 316 that the user can click on (e.g., with a finger or other mechanism) to open the applications. In addition, the user interface 312*a* also includes a selectable element 318 which the youth can click on to view a library of educational content that is specific to the youth's age.

The content that is shown on the user interface 312*a* may be determined by the child version of the software application when the user device 310 sends a request to the child version of the software application. In response, the child version of the software application may query the user profile for the age of the user at the time that they were onboarded and a time at which the age of the user was recorded. The software application may compare the time at which the age of the user was initially recorded to a current time (e.g., via a system clock of the host platform, etc.) to determine a current age of the youth at the time of the request.

In one embodiment, the age of the user may be an account characteristic of the user, and a user profile may be an account profile.

For example, FIG. 3B illustrates a process 300B of a child version of a software application 332 determining a current age of the youth at a time of a request for user interface content. In this example, the user device 310 is connected to a host platform 330 over a network. The host platform 330 hosts the child version of the software application 332. The youth may open the front-end of the child version of the software application 332 on the user device 310, for example, via a locally-installed application, a browser, or the like. In response, the child version of the software application 332 may determine a current time from a system clock 336 of the host platform 330 and compare it to a timestamp stored in a user profile of the youth associated within the user device 310. The timestamp may be stored in a user profile data store 338 and it may represent the time at which the youth initially onboarded with the application. Here, the child version of the software application 332 may use the current time and the timestamp to determine how much time has elapsed since the youth was onboarded. This time may be added to the youth's age that was stored in the user profile at the time of the onboarding to determine a current age of the youth at the time of this request.

In this example, the child version of the software application 332 may have different age categories which determine which visual content is output to the user. For example users between the ages of 10-12 years may view a first dashboard of content, users between the ages of 13-15 years may view a second dashboard of content with features, visual aids, training materials, and functions that are different than the first dashboard of content, and users between the ages of 16-18 years may view a third dashboard of content with different features, visual aids, training materials, and functions than the first and second dashboards of content. Here, the child version of the software application 332 may determine that the user has newly reached a new age category based on the current age of the user at the time of the request, and dynamically morph the content shown on the user interface of the user device 310 based on dashboard content stored in a dashboard content data store 334.

For example, FIG. 3C illustrates a view 300C of a user interface 312*b* that is generated by the child version of the software application 332 by morphing the dashboard content that is output on the user device 310. In this example, the user interface 312*b* includes different windows of content than the user interface 312*a*, including a window 322 directed to a savings account that the youth has established and a window 324 that is directed to a loyalty program associated with the savings account. In addition, the user interface 312*b* includes a different set of applications with icons 326 that may be different in size, shape, color, location, etc. than the icons 316 in the user interface 312*a*. Also, the educational content may be different and can be selected from a button 328 within the user interface 312*b*. This process may be automated by the child version of the software application 332.

In the example embodiments, profile information received during software application registration may be used to determine a user's age and set their software to be a child version of the application based on the received age and to allow the functionality of the child version to be controlled by the parent version of the application used by a second user. Furthermore, when the youth reaches a certain age, the parent version of the software application may automatically be disconnected from the child version of the software application. For example, if the software determines that the youth's age is above a predetermined threshold age, the disconnection may be performed automatically or at the request of the youth or the guardian.

The process begins when a user registers on the software application, entering relevant profile information, including birthdate. The information provided is then used to ascertain the user's age and tailor the application experience to their age range. If the user's age is determined to be below a specified threshold, the software automatically assigns the user to the child version of the application. This version is typically more restrictive and may feature simplified interfaces, limited functionality, and enhanced safety and privacy measures suitable for younger users. A second user, usually a parent or guardian, will use the parent version of the application. This version can monitor and control the functionality of the child version. For example, the parent may set usage time limits, monitor interactions, or restrict access to certain features or content within the child version of the application.

According to various embodiments, a synchronized interaction exists between the child and parent versions of the application. Changes made by the parent in the parent version are reflected in the child version in real-time or upon the next log-in, allowing for dynamic modification of the child's software experience based on the parent's inputs. When the user of the child version reaches a predetermined age threshold, the software application may automatically reevaluate the user's access level. Upon confirming that the user's age is above the threshold, the connection between the parent and child versions of the application is severed. The user is then granted a standard or adult version of the application with full functionality and without the controls imposed by the parent version.

In one embodiment, the system leverages a virtual reality application to create an immersive financial education learning experience. Upon registration and age verification, the application provides users a VR environment tailored to their age group. For example, younger children might explore a virtual town to learn basic money concepts like saving and spending. At the same time, teenagers may navigate a more complex virtual world, simulating real-life financial scenarios such as investing or budgeting for college. The VR environment evolves as the user grows, offering increasingly sophisticated lessons in finance and economics. The system creates a series of engaging, interactive worlds that cater to different age groups, with the content evolving as the user grows older, ensuring age-appropriate financial learning. For younger children (ages 6-9 years), the VR environment is designed to be vibrant and playful, resembling a colorful animated town. Children in this virtual town engage in simple financial activities, such as earning virtual coins to complete small tasks or chores. They use these coins in various scenarios, like buying items for a virtual pet or saving for a toy. The emphasis is on fundamental concepts like the value of money, basic saving, and understanding needs versus wants. Interactive characters, such as talking animals or friendly robots, guide the children through these activities, making learning fun and engaging. For preteens (ages 10-12 years), the VR environment is more sophisticated. The setting shifts to a small city where users explore more complex financial concepts. They are given a virtual allowance and faced with decisions like budgeting for a school trip, managing a small savings account, or learning the basics of interest. Additionally, interactive games simulate real-life scenarios, like running a lemonade stand, to understand profit and loss. For teenagers (ages 13-17 years), the VR world transforms into a comprehensive simulation of real-world financial management. Users experience scenarios like managing a budget for college, understanding and using credit cards, and learning about investments and the stock market. This stage introduces career-oriented simulations, like managing finances on a simulated salary based on different career choices, preparing teenagers for real-life financial decisions, and providing a safe space to learn and make mistakes. The system evolves the content, scenarios, and challenges based on the user's age and learning progress. An intelligent algorithm tracks the user's interactions and learning outcomes, dynamically adjusting the complexity and type of financial content presented, ensuring that users are continuously challenged and engaged, making financial learning a continuous process. Parents are involved in the learning process through a companion application. The application provides insights into their child's progress and offers tips on reinforcing these lessons in real life. It also suggests family activities related to financial education, bridging the gap between virtual learning and real-world application.

In one embodiment, the system uses AR to gamify the experience of setting and achieving savings goals. The system first determines the user's age, and the app sets age-appropriate savings challenges, integrating them into the AR game. For instance, younger users might be tasked with saving virtual coins to build a digital treehouse, while older users might save for real-world goals, like a car, visualized through AR. After the user's age is verified during registration, the application tailors savings challenges to be age-appropriate and integrates the challenges into the AR game. For young children (ages 6-9 years), the AR experience is simple and visually appealing. Children save virtual coins they earn by completing small tasks or chores. In the AR world, the coins can be used to build or customize a virtual object, like a treehouse or a playroom. The AR experience includes engaging graphics, animated characters, and simple, intuitive gameplay. For preteens (ages 10-12 years), the AR challenges are more sophisticated. For example, preteens are given a virtual budget to manage a project, like organizing a virtual event or constructing a small virtual city. This phase introduces budgeting and resource allocation. Users learn to balance a virtual budget against their goals, simulating real-life financial decision-making in an age-appropriate context. For teenagers (ages 13-17 years), the AR environment simulates more realistic financial scenarios, including saving for real-world objectives, such as a gadget, a concert ticket, or college funds. The AR application projects the goals into the real world, showing a 3D model of the gadget they're saving for in their room. As they progress towards their savings goal, additional features are added to the model, visually representing their progress. The application features interactive learning modules that offer tips on saving money, understanding interest rates, and other financial concepts. The modules are presented at various game stages, ensuring users learn as they play. The AR experience is personalized based on the user's age, savings goals, and learning progress. Parents can set savings goals and monitor progress through a linked application.

In one embodiment, the system utilizes an AI-driven storytelling application that delivers financial education through interactive narratives. The application leverages artificial intelligence (AI) to generate engaging, age-appropriate financial stories that users interact with to learn about money management, budgeting, investments, and other financial concepts. The AI crafts simple, fairytale-like stories for young children where characters face financial decisions in their adventures. For instance, a story might involve a character saving magical coins to buy a portion, teaching children about the value of saving and delayed gratification. The AI ensures that the language is simple and that the financial lessons are introduced subtly within the story's context. The children interact with the story by making choices for the characters, influencing the narrative, and introducing them to the consequences of financial decisions. The storytelling becomes more complex as the user enters the pre-teen age bracket. The AI creates interactive adventures where characters must budget for quests or manage resources to overcome challenges. The narratives delve into concepts like the importance of budgeting and the basics of earning interest. The stories maintain an element of fantasy or science fiction to keep users engaged, but the financial lessons are more direct, and users must make more nuanced decisions. For teenagers, the stories evolve into sophisticated simulations of real-life financial scenarios. Characters navigate through starting a business, investing in stocks, or saving for college. Teen users are presented with scenarios requiring critical thinking and understanding of more complex financial instruments. The AI personalizes the storylines based on the user's prior knowledge and choices, providing a customized learning path. The AI monitors user interactions, learning outcomes, and the choices made within the stories to adapt the narrative and the embedded financial lessons. Progress tracking is incorporated, allowing users and their guardians to see how they advance regarding financial understanding and decision-making. The system integrates with school curriculums, offering a supplementary tool for teachers to provide financial education in a way that resonates with students. The stories are tailored to fit various educational frameworks, making it a versatile tool for both in-class and remote learning. Users receive feedback on their decisions within the story to understand the implications of their financial choices. Rewards, in the form of story progression, unlockable content, or even recognition within the application, encourage users to continue engaging with the stories and learning about finance.

In one embodiment, the system utilizes an application to promote financial literacy through social engagement and benchmarking. The application allows users to compare their financial knowledge and habits with peers in the same age group. After age verification, users opt-in to anonymously share their financial learning progress, savings goals, and achievements. The application uses the data to provide comparative insights and benchmarks, encouraging healthy financial habits through peer influence and collective learning experiences. This includes features like shared challenges, leaderboards, and rewards for achieving financial literacy milestones. The application employs a user's age and demographic information to facilitate age-appropriate peer-to-peer interaction and comparison. The system allows users to compare their financial knowledge and habits with their peers. For young users (ages 6-9 years), the application features a friendly interface with avatars and simple visual representations of savings and spending habits. Children earn badges and rewards by completing financial literacy games and challenges, which they can compare with friends or classmates who also use the application. As users mature (ages 10-12 years), the application introduces more advanced financial concepts, such as budgeting and planning for future purchases. Preteens set up virtual savings goals, like saving for a new bike or video game, and track their progress against peers. The application encourages group challenges, where friends save together for a collective goal, fostering teamwork and collective financial decision-making. For teenagers (ages 13-17 years), the application includes features such as simulated stock market investments, where users can manage a portfolio with virtual money. They can see how their investment choices stack up against those of their friends and the larger community. This includes leaderboards, forums for sharing strategies, and insights into how different financial decisions lead to varying outcomes. The application incorporates a sophisticated feedback system that gives users insights into how their financial habits compare to those of their peers, both within their age group and in the broader community. The feedback is gamified, with points and levels to motivate users to improve their financial knowledge and behaviors. The system can be integrated into educational settings, allowing teachers to create classroom-wide challenges and learning modules. Parents can also access the platform to view their child's progress and provide guidance.

In one embodiment, the system leverages an application to facilitate a collaborative financial learning experience between parents and their children. After registering and determining the child's and parent's ages, the app offers joint financial activities and educational content. For younger children (ages 6-9 years), the application presents a series of simple, interactive financial games and activities in which parents and children can engage. The activities are designed to be fun and educational, teaching basic financial concepts such as earning, saving, and spending responsibly. For example, a game might involve the child completing household chores to earn virtual money, which they can then allocate to different 'savings jars' within the app under their parent's guidance, fostering an understanding of work-reward principles and the basics of budgeting. As the child matures to a preteen (ages 10-12 years), the platform increases in complexity, introducing concepts, including long-term saving for goals, the basics of interest, and charitable giving. The parent and child set joint financial goals, such as saving for a family vacation or a new bicycle and track their progress together. The application offers simulations where the child can 'invest' in a virtual lemonade stand and, with their parent's help, learn to manage expenses and profits. For teenagers (ages 13-17 years), the application provides a sophisticated set of financial tools and educational resources that simulate adult financial responsibilities. These include budgeting for college, understanding credit scores, and introductory investment concepts. The teenager has more autonomy in decision-making within the application, but parents still have access and can offer advice or set specific controls. The application simulates real-life financial scenarios and provides a platform for discussing student loans, employment, and financial planning for future independence. The educational modules and tools within the application automatically adjust to align with the child's current age and demonstrated financial understanding. The platform incorporates gamification elements, including rewards for completing modules and achieving savings goals. These rewards include in-application currency to be used in games and real-world incentives like extra screen time or a small allowance boost. The system integrates with real banking tools, allowing for the creation of supervised checking or savings accounts, providing a hands-on approach to managing real money with the safety net of parental oversight.

In one embodiment, the system captures a user's age within an application to generate age-appropriate content that dynamically alters as the user ages. During the onboarding process of the application, the user's age is recorded and stored within a user profile in the application. The age data is pivotal for the subsequent operations of the software, as it determines the type of content and interface the user will experience. Once the user is onboarded and their age is stored, the system receives requests from the user's device, which is registered with the software application. These requests typically pertain to accessing the user interface of the application. Upon receiving a request, the system utilizes the system clock to determine the current time and compare the current time with the user's onboarded age stored in the user profile. The comparison calculates the user's current age and updates the user's age accordingly. After calculating the current age, the system dynamically generates visual content suitable for the user's age at the time of the request. The content is displayed within the user interface of the software application. The visual content varies significantly depending on the age category of the user. For instance, users in different age brackets, such as 10-12, 13-15, and 16-18, are provided with distinct dashboards of content, each with unique features, visual aids, training materials, and functions. The user device communicates with the system over a network, sending requests to the software application. The application, in turn, interacts with the user profile data store to retrieve the onboarded age and uses the system clock for current time data. This data is processed by the system to determine the current age and to select the appropriate content from the dashboard content data store. The selected content is then rendered on the user interface, customizing the user's experience based on age and development stage.

Figure 4B:
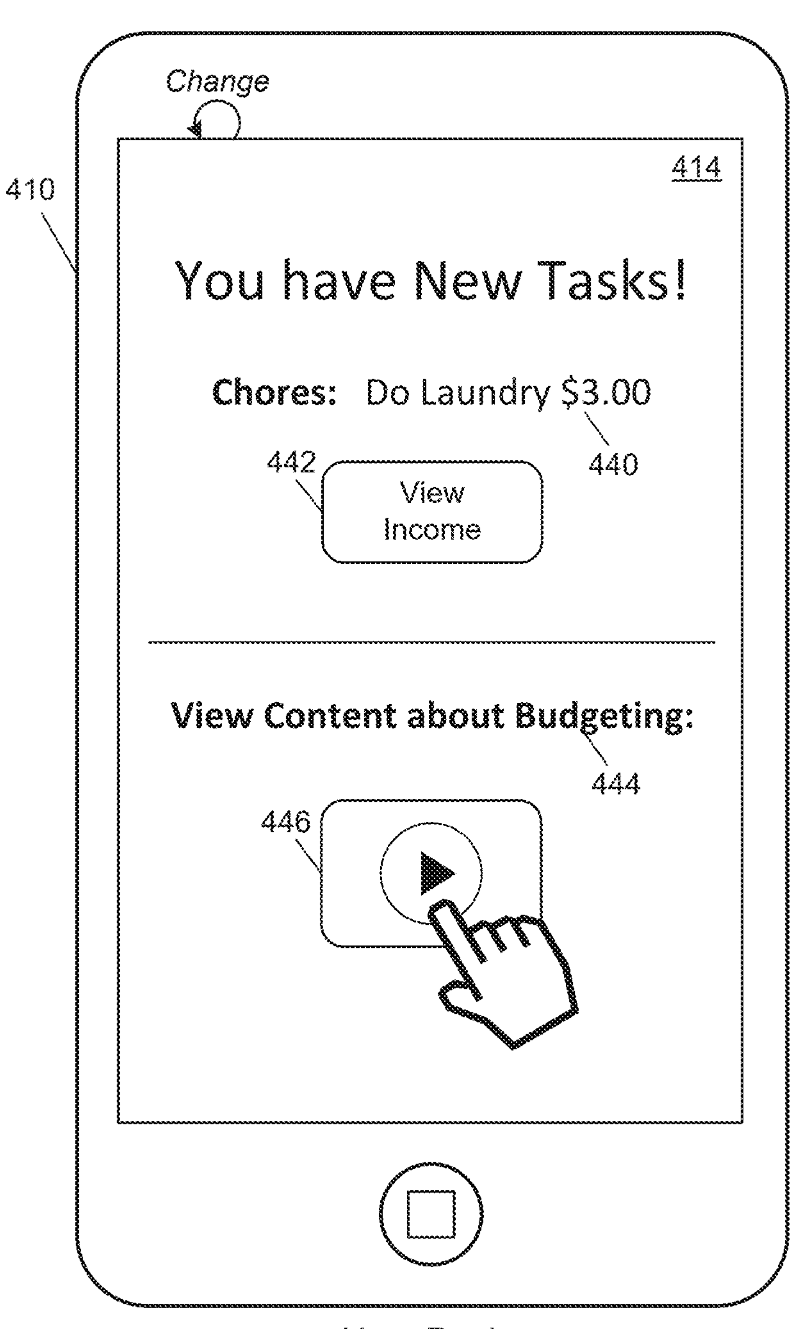

FIGS. 4A-4E illustrate a process of a guardian version of the software application remotely controlling a child version of the software application according to example embodiments. For example, FIG. 4A illustrates a process 400A of a remote command or instruction being sent from a guardian's user device 430 using a guardian version of a software application 422*b* to a child's user device 410 of a child version of a software application 422*a*. In this example, the child version of the software application 422*a* is used by the child's user device 410 while the guardian version of the software application 422*b* is used by the guardian's user device 430 based on registrations of the users of the devices. The child's user device 410 is a youth device. Both the child version of the software application 422*a* and the guardian version of the software application 422*b* are hosted by a host platform 420. Here, the host platform may also store dashboard content in a dashboard content data store 424, user profile content in a user profile data store 426, and payment account data in a financial account data store 428.

In this example, the guardian version of the software application 422*b* may display control content 434 on a user interface 432 of the guardian's user device 430. The guardian can interact with the control content 434 to control the experience of the youth. For example, the guardian may submit commands or instructions which control child content 414 that is displayed on a user interface 412 of the child's user device 410. The guardian may submit tasks for the youth to perform which are then displayed on the user interface 412. As another example, the guardian may select educational materials which are then enabled and made visible on the user interface 412 of the child's user device 410. As another example, the guardian may set tasks for the youth to complete such as chores, school, games, literature, and the like. The guardian may also send money to the youth through the connected applications. The child content 414 may be dynamically updated on the user interface 412 based on commands that are sent remotely from the guardian's user device 430.

FIG. 4B illustrates a view 400B of an example of the child content 414 that may be morphed/displayed on the child's user device 410 by the child version of the software application 422*a* based on a remote instruction from the guardian version of the software application 422*b*. Here, the child content 414 includes a description of a chore 440 for the youth to perform, and a button 442 which allows the youth to view their current income which may include new income that will be provided to the youth when the chore 440 is completed. In addition, the child content 414 includes a heading 444 which describes educational content that may be displayed on the child's user device 410 in response to the youth entering or pressing on a play button 446 or the like.

Here, the youth may have the opportunity to view the new chore and the income they will receive from completing the chore, and also watch an educational video on how to properly budget the earnings they receive from the chore. Meanwhile, the child version of the software application 422*a* may monitor the activity of the user within the software application and determine which educational materials have been consumed. The child version of the software application 422*a* may also determine whether the youth has implemented the educational materials, for example, based on their actions within the software application, their actions within their financial account, their actions with tasks, and the like. In some embodiments, the child version of the software application 422*a* may detect that the youth has reached a new milestone such as completing a chore, completing an educational material, adding a new feature to their financial account, or the like, and notify the guardian version of the software application 422*b* of the new milestone being achieved by the youth.

For example, FIG. 4C illustrates a process 400C of the child version of the software application 422*a* outputting/playing content 416 via the user interface 412 of the user device 410. In this example, the content 416, such as educational content, may be retrieved from the dashboard content data store 424 of the host platform 420 which hosts the child version of the software application 422*a*. The child version of the software application 422*a* may monitor and determine the progress of the youth as the youth interacts with and consumes the content 416. In some embodiments, the content 416 may be educational and interactive and the progress of the user may be compared to other users of the software. In this example, the progress of the user may be stored on a leaderboard 423 that is shared with multiple other youths (e.g., friends, contacts, family, etc.) that the youth has approved or otherwise invited.

When the training is finished, the child version of the software application 422*a* may continue to monitor the activity of the youth with respect to the child version of the software application 422*a*, a financial account of the user stored within a user profile in the user profile data store 426, and the like. This enables the child version of the software application 422*a* to detect when the educational materials have been implemented by the youth in the real world.

For example, the content 416 may include educational content describing how to open a checking account, including numbers to call, identifying information that will be needed, the initial deposit information, and the like. The child version of the software application 422*a* may monitor the user profile of the youth within the user profile data store 426. When the youth subsequently opens a checking account in the youth's name, the financial institution may update the user profile of the youth within the user profile data store 426 via a server 402 of the financial institution. Furthermore, the child version of the software application 422*a* may detect the update to the user profile and determine that the youth has implemented the training by opening the checking account. In response, the child version of the software application 422*a* may display new content on the user interface 412 of the child's user device 410 to reflect that the training has been implemented. For example, the new content may include new training materials, new user interface elements, new visual aids, new functionality that can be used within the software application such as new services, new loyalty programs, new card account windows, and the like.

Figure 4D:
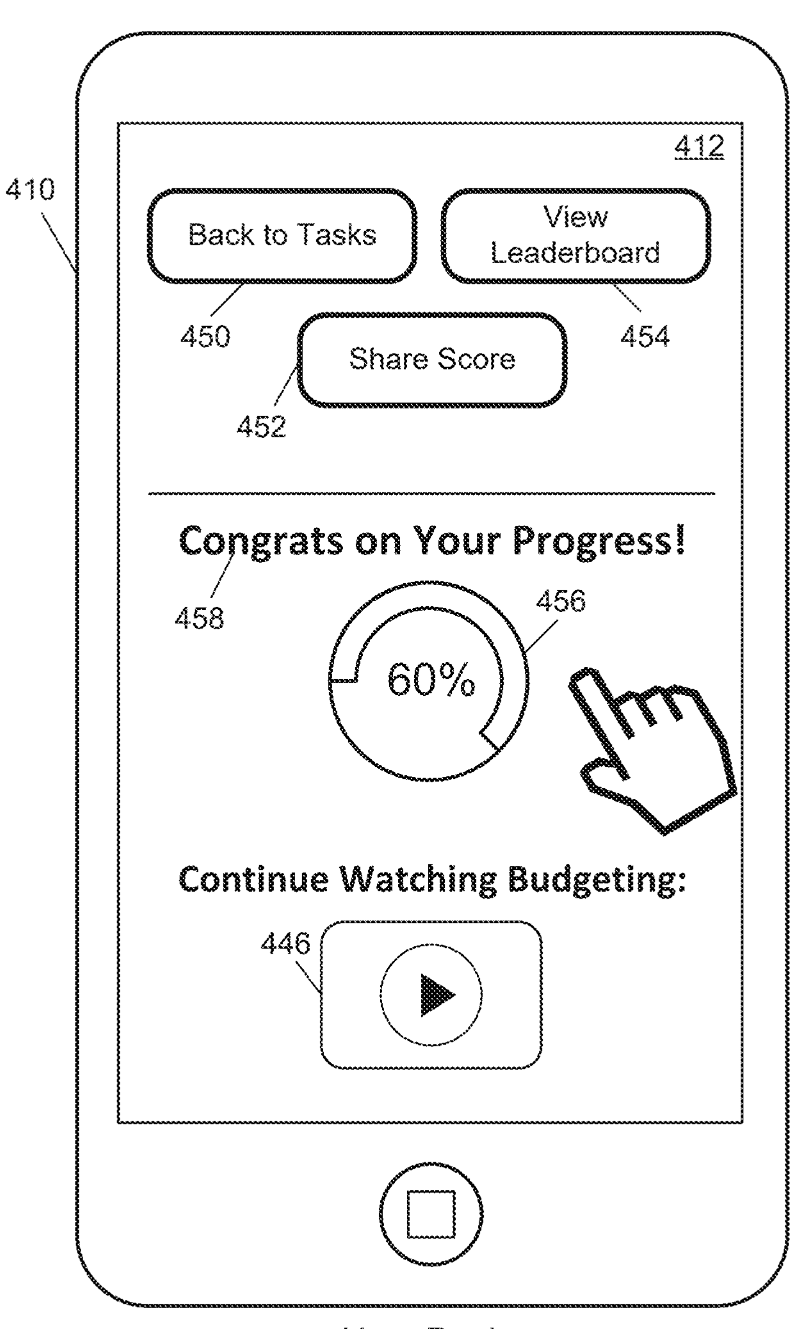

For example, FIG. 4D illustrates a view 400D of the user interface 412 of the user device 410 with updated content based on the monitored activity of the youth in FIG. 4C. In this example, the child version of the software application 422*a* determines a progress of the user with respect to the visual aids/training aids and displays a progress bar 456 on the user interface 412 along with a celebratory notification 458 celebrating the progress of the youth. The child version of the software application 422*a* also displays selectable options 450, 452, and 454 which enable the youth to navigate to different pages of the software application and share their progress with another user. The user interface 412 also continues to display the play button 446 so that the youth can resume the educational content from the point where the progress ended.

According to various embodiments, as the youth ages, the child version of the software application 422*a* may be disconnected from the guardian version of the software application 422*b*. For example, FIG. 4E illustrates a process 400E of the child version of the software application 422*a* being automatically disconnected from the guardian version of the software application 422*b* once the youth reaches a certain age or otherwise changes from one age category to another. For example, the child version of the software application 422*a* may be automatically disconnected from the guardian version of the software application 422*b* when the youth becomes 15 years old or some other predefined age. In this example, the child version of the software application 422*a* monitors a system clock 460 and determines a current age of the youth based on the original age of the youth stored in the user profile and the timestamp at the time of the age of the youth being stored in the user profile.

As another example, either the guardian or the youth may request the disconnection of the guardian version of the software application 422*b*. For example, the youth may submit a request to the child version of the software application 422*a* via the user interface 412. If the youth has not reached the predefined age, the request to disconnect may be declined. However, if the youth has reached the age, the request may be granted. Similarly, the guardian may submit a request to the guardian version of the software application 422*b* via the user interface 432. If the youth has not reached the predefined age, the request to disconnect may be declined, otherwise it may be granted.

As another example, when the process has determined that the user has viewed and interacted with a visual aid and implemented training, an avatar's position may be changed within a game to reflect the implemented training. The process begins when a user registers to use the software application. During registration, users provide profile information, including their birthdate. The instant solution calculates the user's age from their birthdate and determines an appropriate age bracket. Once the user's age is determined, the software application adapts its interface, displaying visual aids suitable for each age bracket.

Figure 5A:
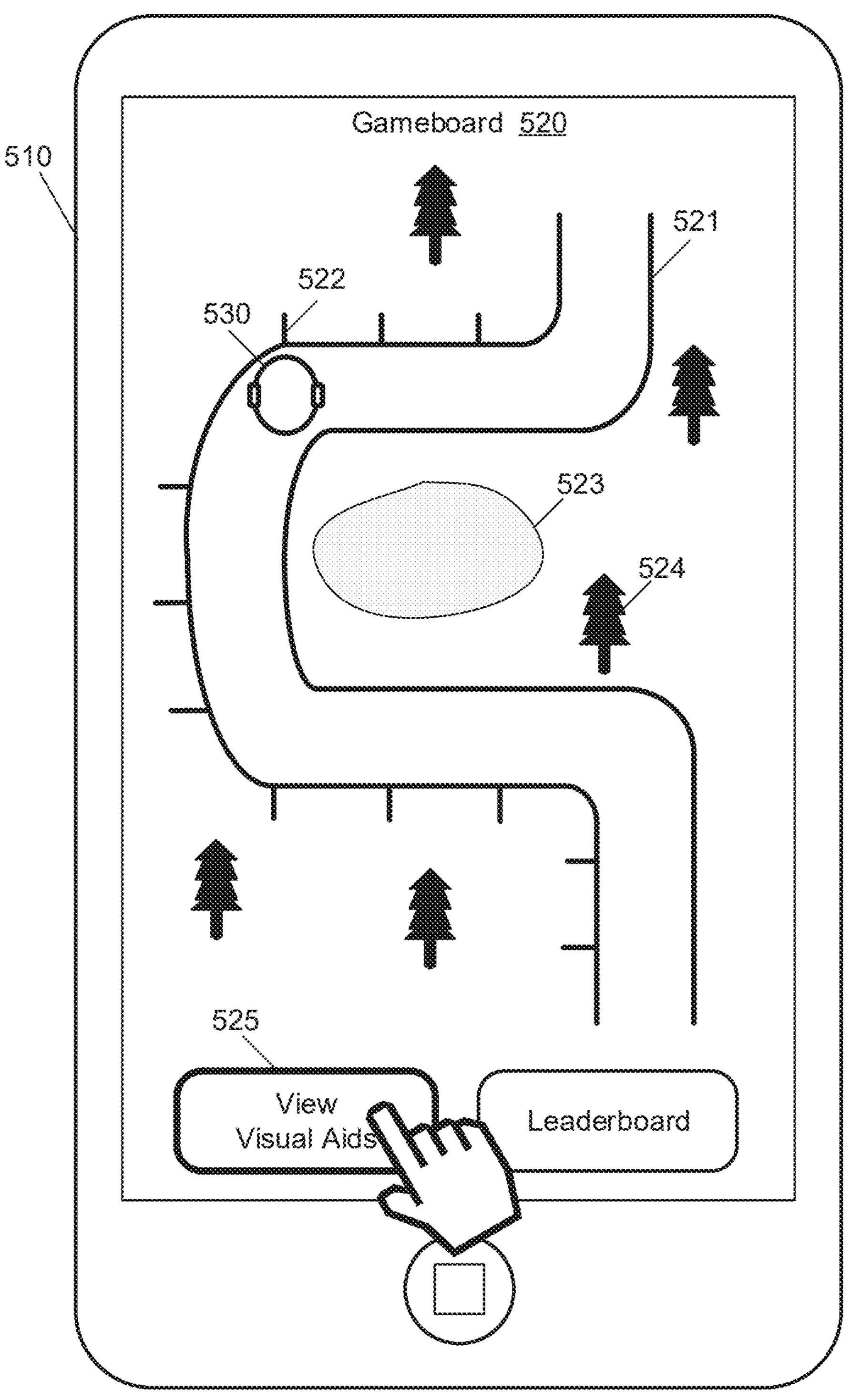
FIGS. 5A-5D are diagrams illustrating a process of outputting educational content via a gamified learning experience according to example embodiments.
Figure 5B:
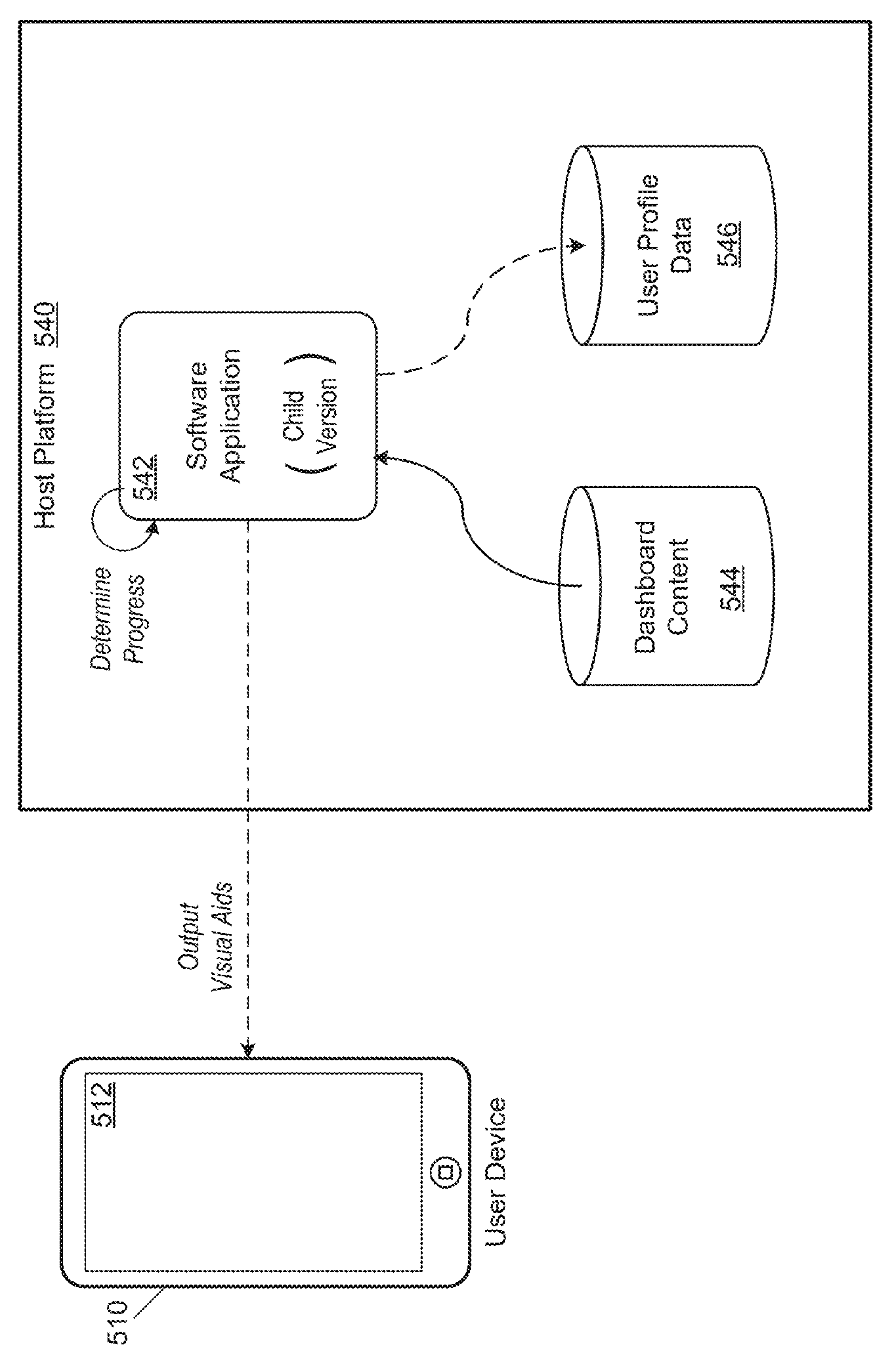
Figure 5C:
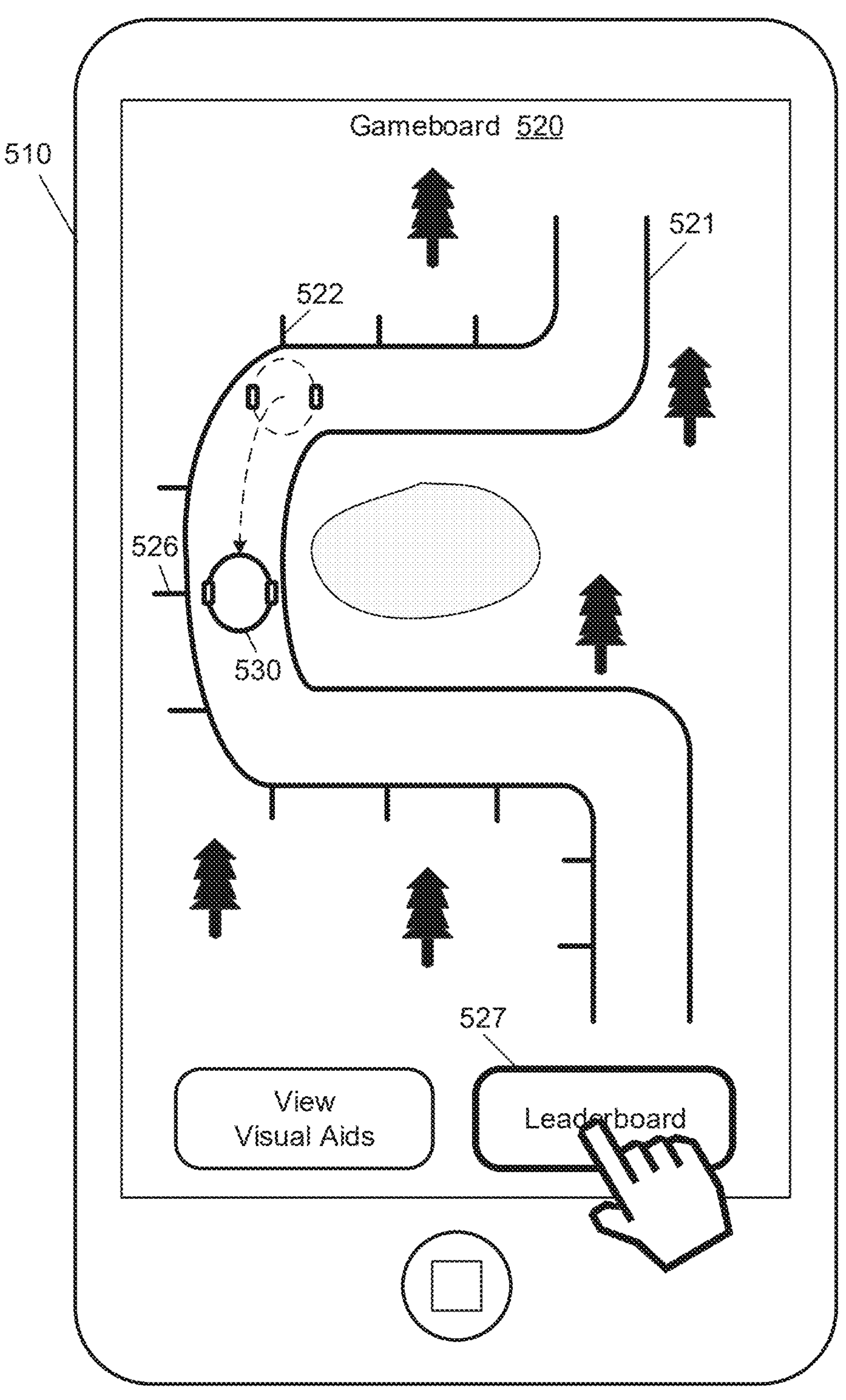

FIG. 5A illustrates a view 500A of a gameboard 520 that may be output on a user interface of a user device 510. The gameboard 520 may be a visual aid with graphical elements, tutorials, training videos, tips, or user guides designed to help users navigate and use the application effectively. In some embodiments, the gameboard 520 is a virtual game, animated game, interactive game, and/or the like. The training materials may include interactive tutorials or learning modules aimed at enhancing user knowledge and skills related to the application. In this example, the gameboard 520 includes a path 521 on which an avatar 530 travels to represent progress of the youth with the training materials. As more educational materials are consumed, the avatar 530 may be moved farther on the path 521. The gameboard 520 also includes user interface elements 523 and 524 which may be interactive. If interactive, the user interface elements 523 and 524 may reveal additional training materials or the like. The gameboard 520 also includes a selectable button 525 which the user can select with a finger or other mechanism to request a visual aid.

The instant solution monitors whether the user views and interacts with the provided visual aids and based on this interaction, determines the level of engagement and understanding of the user. For example, FIG. 513 illustrates a process 50013 of a child version of the software application 542 monitoring and determining progress of the youth with a visual aid based on content output by the child version of the software application 542 and consumed by a user interface 512 of the user device 510. The content may be pulled from a dashboard content data store 544 and/or a user profile data store 546 of a host platform 540 that hosts the child version of the software application 542.

As the solution tracks the user's level of engagement, it also moves the avatar 530 through a game environment (e.g., along the path 521 as shown in a view 500C in FIG. 5C) such that the position of the avatar 530 has changed and reflects the user's interaction with the visual aids and implemented training. For example, in FIG. 5C, the avatar is moved from a point 522 on the path 521 to a point 526 on the path 521 based on the youth's progress with the visual aids. Younger users will be more motivated by seeing their progress visually represented in the game, encouraging further interaction and learning. The instant solution may continually adapt the visual aids and the game based on ongoing user interaction and learning.

Figure 5D:
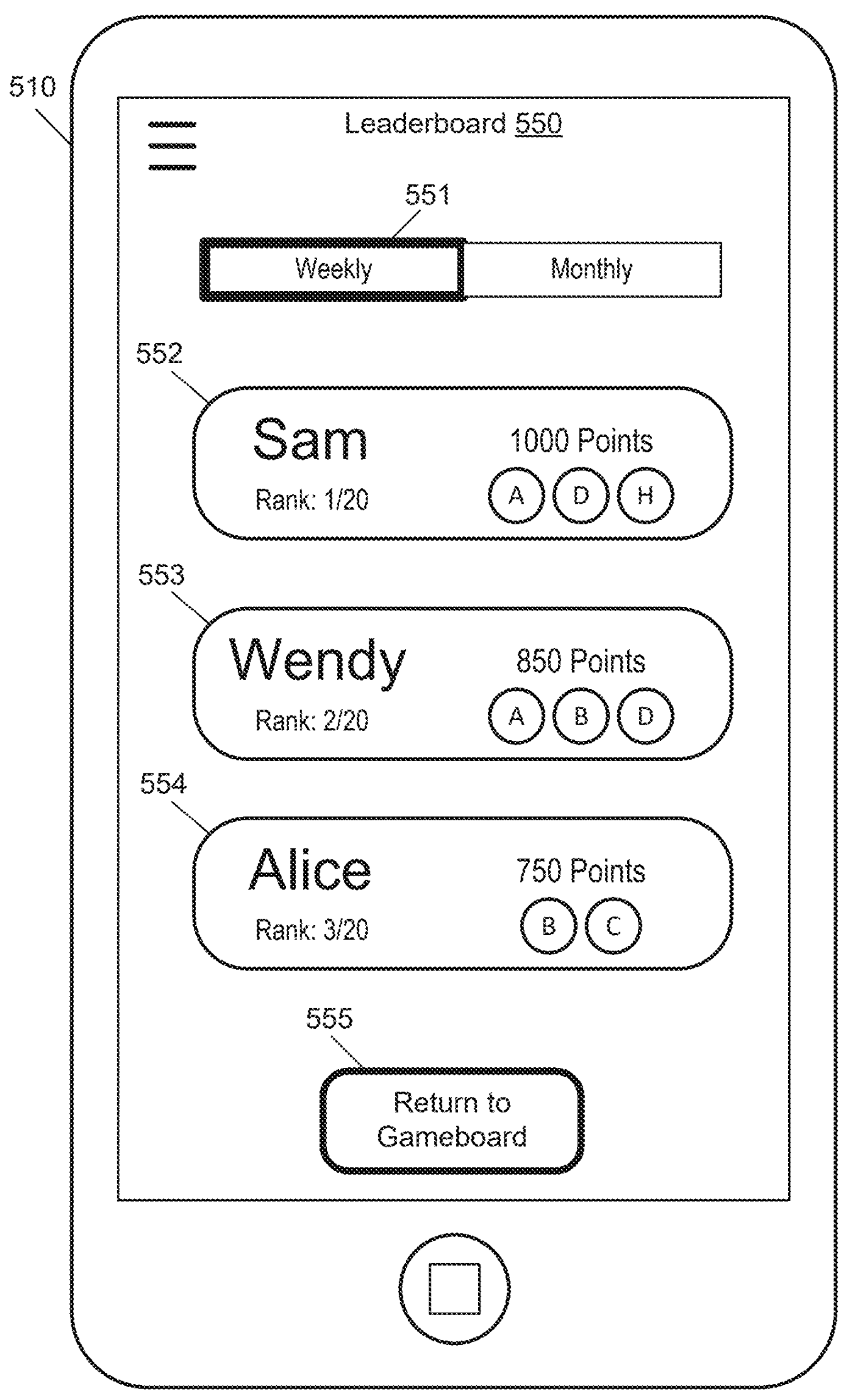

In some embodiments, the youth may select a leaderboard button 527 to view how their progress compares to other users, such as friends, contacts, family members, and the like, which are known to the user. For example, FIG. 5D illustrates a view 500D of a leaderboard 550 which includes an entry 552 representing the youth that is using the gameboard 520 shown in FIG. 5C. Here, the youth has obtained a score that is above two other users with whom the youth has previously registered and which are represented by entry 553 and entry 554 on the leaderboard 550. The entries may include badges or other indicators that visually identify which visual aids the user has completed, and where the user ranks with respect to the other users. The leaderboard 550 also includes a return button 555 that enables the youth to navigate back to the gameboard 520. In some embodiments, the leaderboard 550 may also include a toggle 551 that enables the user to view their progress with respect to other users over different periods of time (e.g., daily, weekly, monthly, etc.)

Figure 6A:
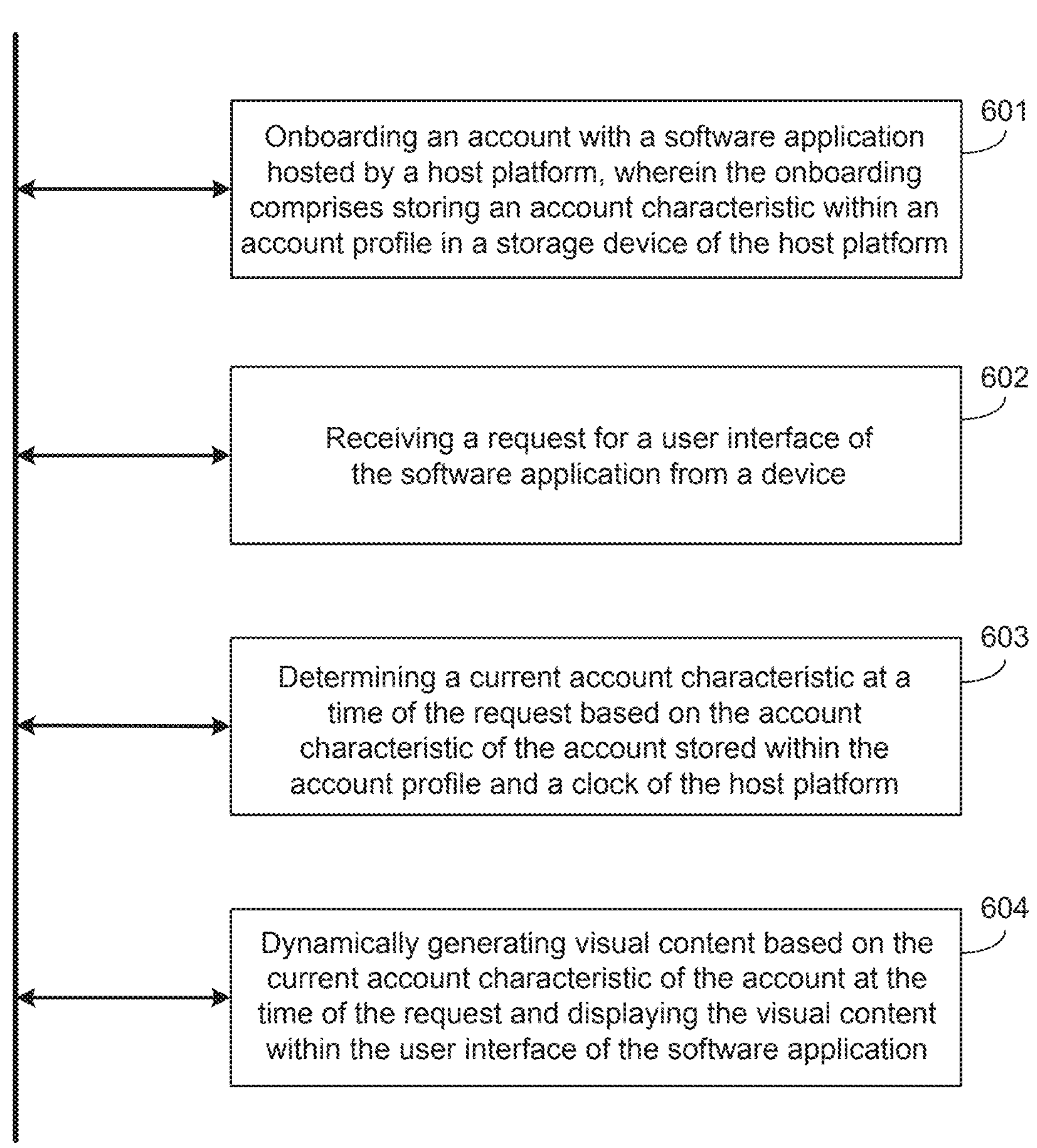
FIG. 6A is a diagram illustrating a method of morphing user interface contents of a software application as a user gets older according to example embodiments.

FIG. 6A illustrates a method 600 of morphing user interface contents of a software application as a user gets older according to example embodiments. As an example, the method 600 may be performed by a computing system, a software application, a server, a cloud platform, a combination of systems, and the like. Referring to FIG. 6A, in 601, the method may include onboarding an account with a software application hosted by a host platform, wherein the onboarding comprises storing an account characteristic within an account profile in a storage device of the host platform. In one embodiment, the age of the user may be a characteristic of the user and a user associated with the software application may be an account of the software application.

In 602, the method may include receiving a request for a user interface of the software application from a device. In 603, the method may include determining a current account characteristic at a time of the request based on the account characteristic of the account stored within the account profile and a clock of the host platform. In 604, the method may include dynamically generating visual content based on the current account characteristic of the account at the time of the request and displaying the visual content within the user interface of the software application.

In some embodiments, the determining may include determining the current age of the user has exceeded a predefined age threshold, and in response, dynamically activating a feature within the software application and displaying a notification within the user interface that notifies of the activation of the feature. In some embodiments, the method may further include receiving a request for training materials from the user interface, and in response, selecting a media file with educational content from the storage device based on the current age of the user and outputting the educational content via the user interface.

In some embodiments, the method may further include monitoring activity of the user profile within the software application, determining that the user profile has achieved a new milestone based on completion of one or more predefined tasks, and in response, displaying a celebratory notification via the user interface. In some embodiments, the method may further include creating an avatar for the user profile within the software application based on inputs received via the user interface and displaying the avatar on the user interface with the visual content.

In some embodiments, the method may further include pairing the software application with a parental version of the software application, monitoring activity of the user profile within the software application and transmitting notifications to the parental version of the software application based on the activity. In some embodiments, the determining may include determining that the current age of the user has reached a predefined age threshold, and in response, activating an ability for the user to customize one or more features of the software application. In some embodiments, the determining may include determining that the current age of the user has reached a predefined age threshold, and in response, dynamically activating one or more educational media files and enabling the one or more educational media files to be played via the user interface.

Figure 6B:
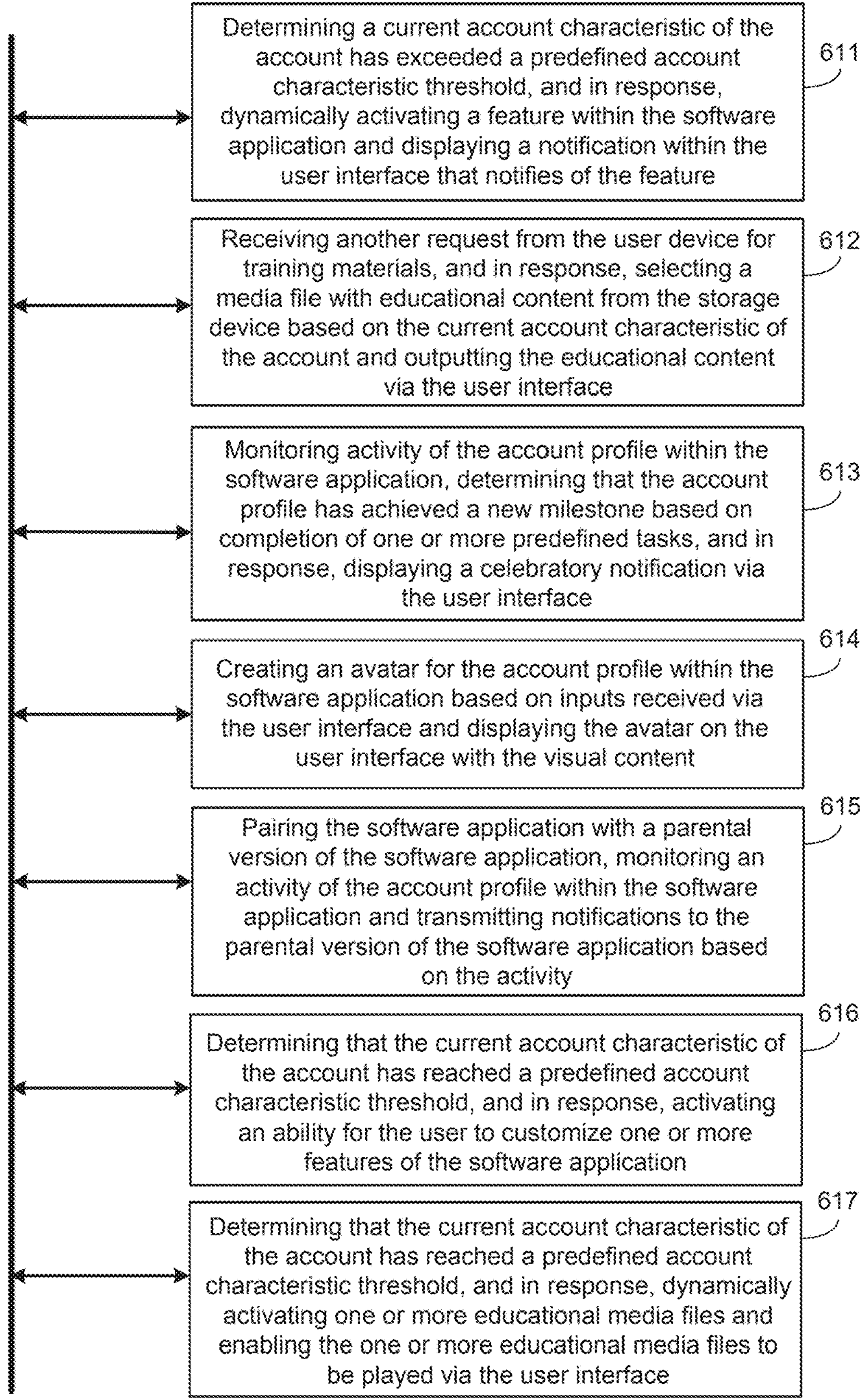
FIG. 6B is an example flow diagram according to example embodiments.

FIG. 6B illustrates a method 610 of an example flow diagram. As an example, the method 610 may be performed by a computing system, a software application, a server, a cloud platform, a combination of systems, and the like. Referring to FIG. 6B, in 611, the method may include determining a current account characteristic of the account has exceeded a predefined account characteristic threshold, and in response, dynamically activating a feature within the software application and displaying a notification within the user interface that notifies of the feature. In 612, the method may include receiving another request from the user device for training materials, and in response, selecting a media file with educational content from the storage device based on the current account characteristic of the account and outputting the educational content via the user interface. In 613, the method may include monitoring activity of the account profile within the software application, determining that the account profile has achieved a new milestone based on completion of one or more predefined tasks, and in response, displaying a celebratory notification via the user interface. In 614, the method may include creating an avatar for the account profile within the software application based on inputs received via the user interface and displaying the avatar on the user interface with the visual content. In 615, the method may include pairing the software application with a parental version of the software application, monitoring an activity of the account profile within the software application and transmitting notifications to the parental version of the software application based on the activity. In

616, the method may include determining that the current account characteristic of the account has reached a predefined account characteristic threshold, and in response, activating an ability for the user to customize one or more features of the software application. In 617, the method may include determining that the current account characteristic of the account has reached a predefined account characteristic threshold, and in response, dynamically activating one or more educational media files and enabling the one or more educational media files to be played via the user interface.

Figure 7A:
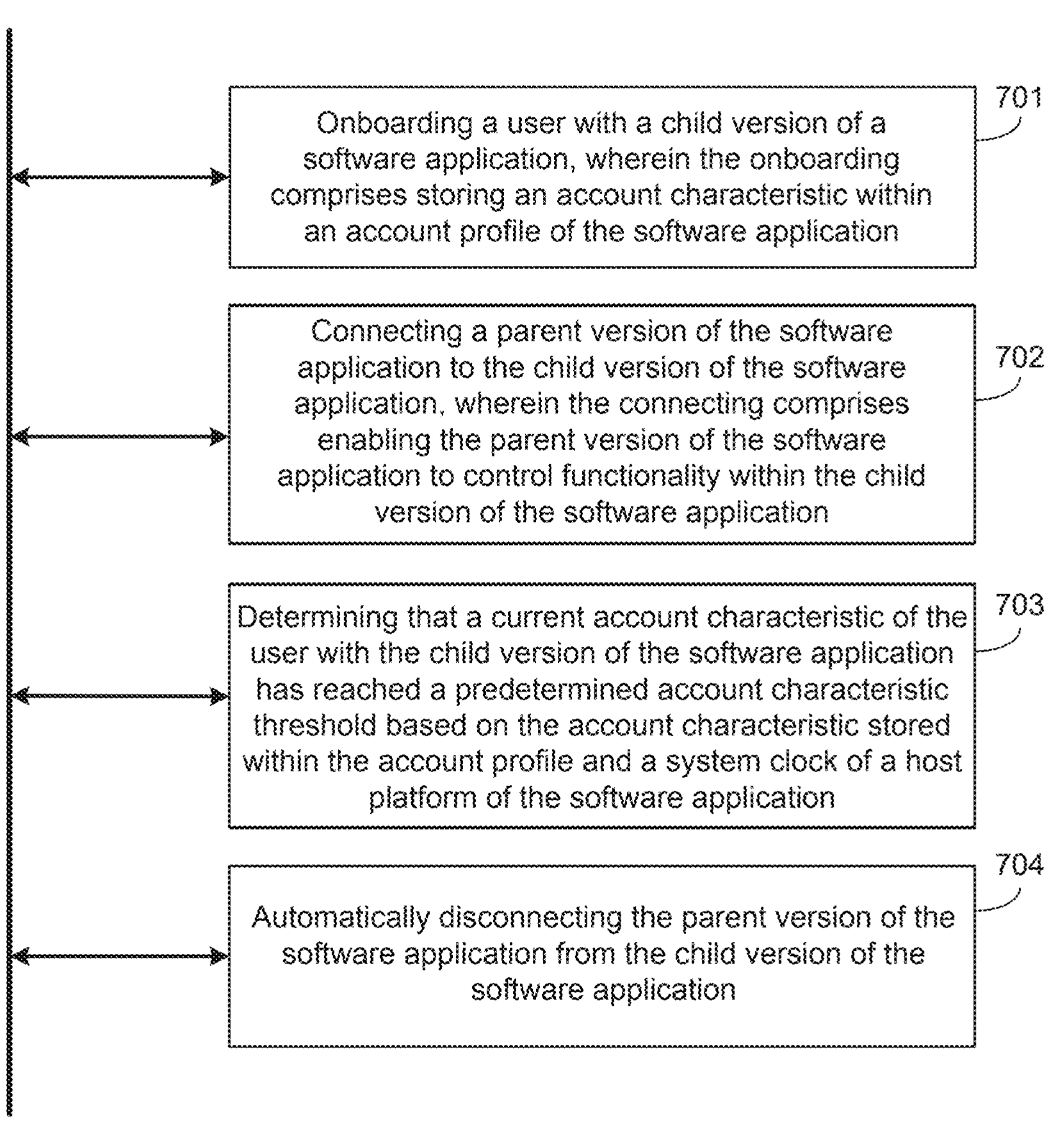
FIG. 7A is a diagram illustrating a method of remotely overseeing a child version of a software application according to example embodiments.

FIG. 7A illustrates a method 700 of morphing user interface contents of a software application as a user gets older according to example embodiments. As an example, the method 700 may be performed by a computing system, a software application, a server, a cloud platform, a combination of systems, and the like. Referring to FIG. 7A, in 701, the method may include onboarding a user with a child version of a software application, wherein the onboarding comprises storing an account characteristic within an account profile of the software application.

In 702, the method may include connecting a parent version of the software application to the child version of the software application, wherein the connecting comprises enabling the parent version of the software application to control functionality within the child version of the software application. In 703, the method may include determining that a current account characteristic of the user with the child version of the software application has reached a predetermined account characteristic threshold based on the account characteristic stored within the account profile and a system clock of a host platform of the software application. In response to the determination, in 704, the method may include automatically disconnecting the parent version of the software application from the child version of the software application.

In some embodiments, the method may further include determining that the user profile has reached a new milestone based on activity within the user profile, and in response, transmitting a notification of the new milestone to the parent version of the software application. In some embodiments, the method may further include receiving an instruction from the parent version of the software application, and in response, dynamically activating one or more additional features of the software application in association with the user profile. In some embodiments, the instruction may be a remote instruction. In some embodiments, the method may further include receiving a request to disconnect the parent version of the software application from the child version of the software application prior to the current age of the user reaching the predetermined age threshold, and in response, declining the request to disconnect the parent version of the software application.

In some embodiments, the method may further include receiving a request to disconnect the parent version of the software application from the child version of the software application, wherein the determining comprises determining that the current age of the user with the child version of the software application has newly reached the predetermined age threshold in response to receiving the request. In some embodiments, the method may further include receiving an instruction from the parent version of the software application, and in response, dynamically activating educational content within the child version of the software application and displaying a notification of the activating via a user interface of the child version of the software application. In some embodiments, the instruction may be a remote instruction.

In some embodiments, the method may further include receiving an input from a user interface of the child version of the software application which indicates completion of a task by the user, and in response, transferring value from a user profile within the parent version of the software application to a user profile within the child version of the software application. In some embodiments, the method may further include receiving an instruction from the parent version of the software application which includes a new task to be performed by the user, and in response, displaying an identifier of the new task within a user interface of the child version of the software application.

FIG. 7B illustrates a method 710 of an example flow diagram. As an example, the method 710 may be performed by a computing system, a software application, a server, a cloud platform, a combination of systems, and the like. Referring to FIG. 7B, in 711, the method may include determining that the account profile has reached a new milestone based on activity within the account profile, and in response, transmitting a notification of the new milestone to the parent version of the software application. In 712, the method may include receiving an instruction from the parent version of the software application, and in response, dynamically activating one or more additional features of the software application in association with the account profile. In 713, the method may include receiving a request to disconnect the parent version of the software application from the child version of the software application prior to the current account characteristic of the user reaching the predetermined account characteristic threshold, and in response, declining the request to disconnect the parent version of the software application. In 714, the method may include receiving a request to disconnect the parent version of the software application from the child version of the software application, wherein the determining comprises determining that the current account characteristic of the user with the child version of the software application has newly reached the predetermined account characteristic threshold in response to receiving the request. In 715, the method may include receiving an instruction from the parent version of the software application, and in response, dynamically activating educational content within the child version of the software application and displaying a notification about the educational content via a user interface of the child version of the software application. In 716, the method may include receiving an input from a user interface of the child version of the software application which indicates completion of a task by the user, and in response, transferring value from an account profile associated with the parent version of the software application to an account profile associated with the child version of the software application. In 717, the method may include receiving an instruction from the parent version of the software application which includes a new task to be performed by the user, and in response, displaying an identifier of the new task within a user interface of the child version of the software application.

Figure 8A:
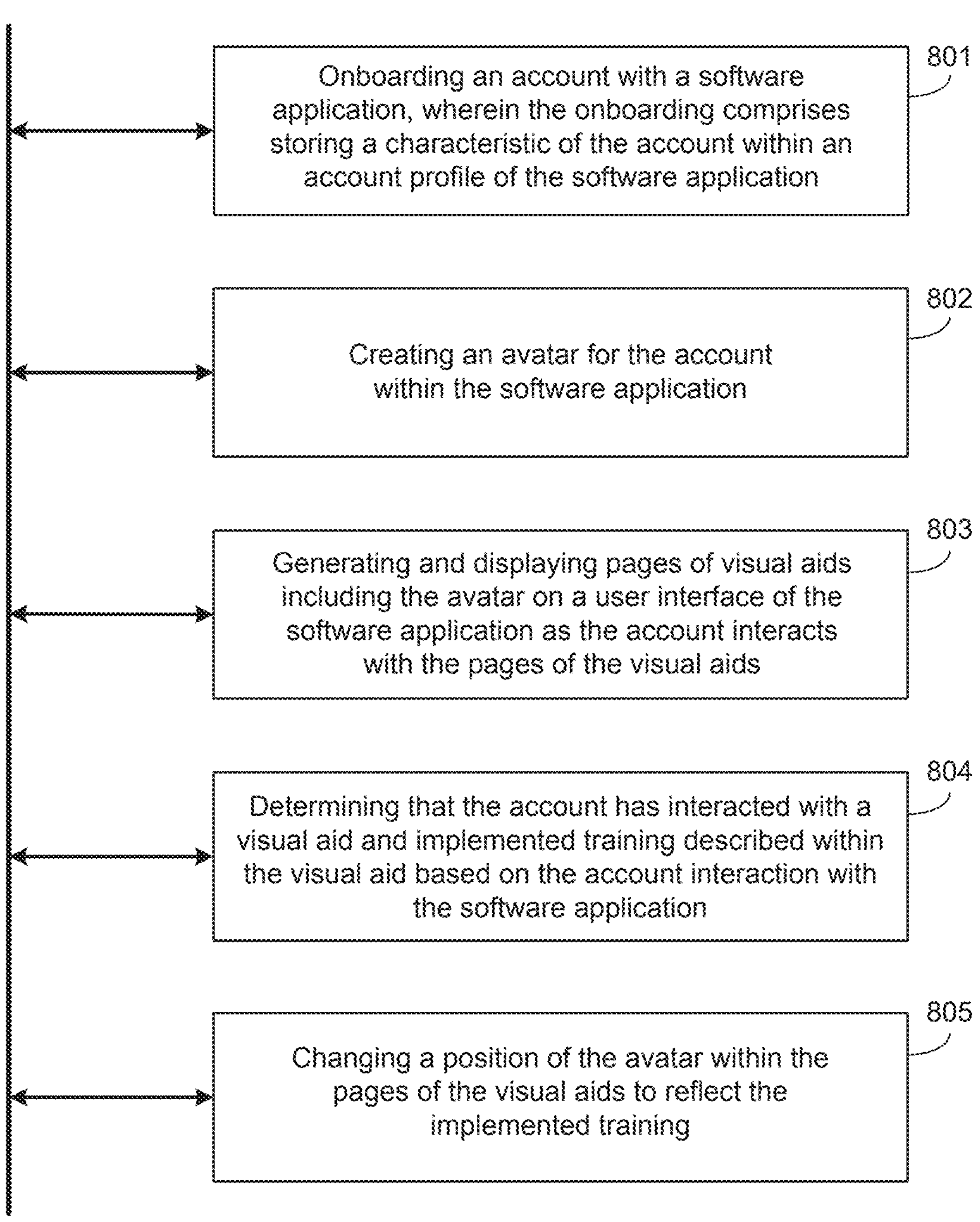
FIG. 8A is a diagram illustrating a method of a personalized and gamified learning experience for a youth according to example embodiments.

FIG. 8A illustrates a method 800 of a personalized and gamified learning experience for a youth according to example embodiments. As an example, the method 800 may be performed by a computing system, a software application, a server, a cloud platform, a combination of systems, and the like. Referring to FIG. 8A, in 801, the method may include onboarding an account with a software application, wherein the onboarding comprises storing a characteristic of the account within an account profile of the software application.

In 802, the method may include creating an avatar for the account within the software application. In 803, the method may include generating and displaying pages of visual aids including the avatar on a user interface of the software application as the account interacts with the pages of the visual aids. In 804, the method may include determining that the account has interacted with a visual aid and implemented training described within the visual aid based on the account interaction with the software application. In response to the determination, in 805, the method may include changing a position of the avatar within the pages of the visual aids to reflect the implemented training.

Figure 8B:
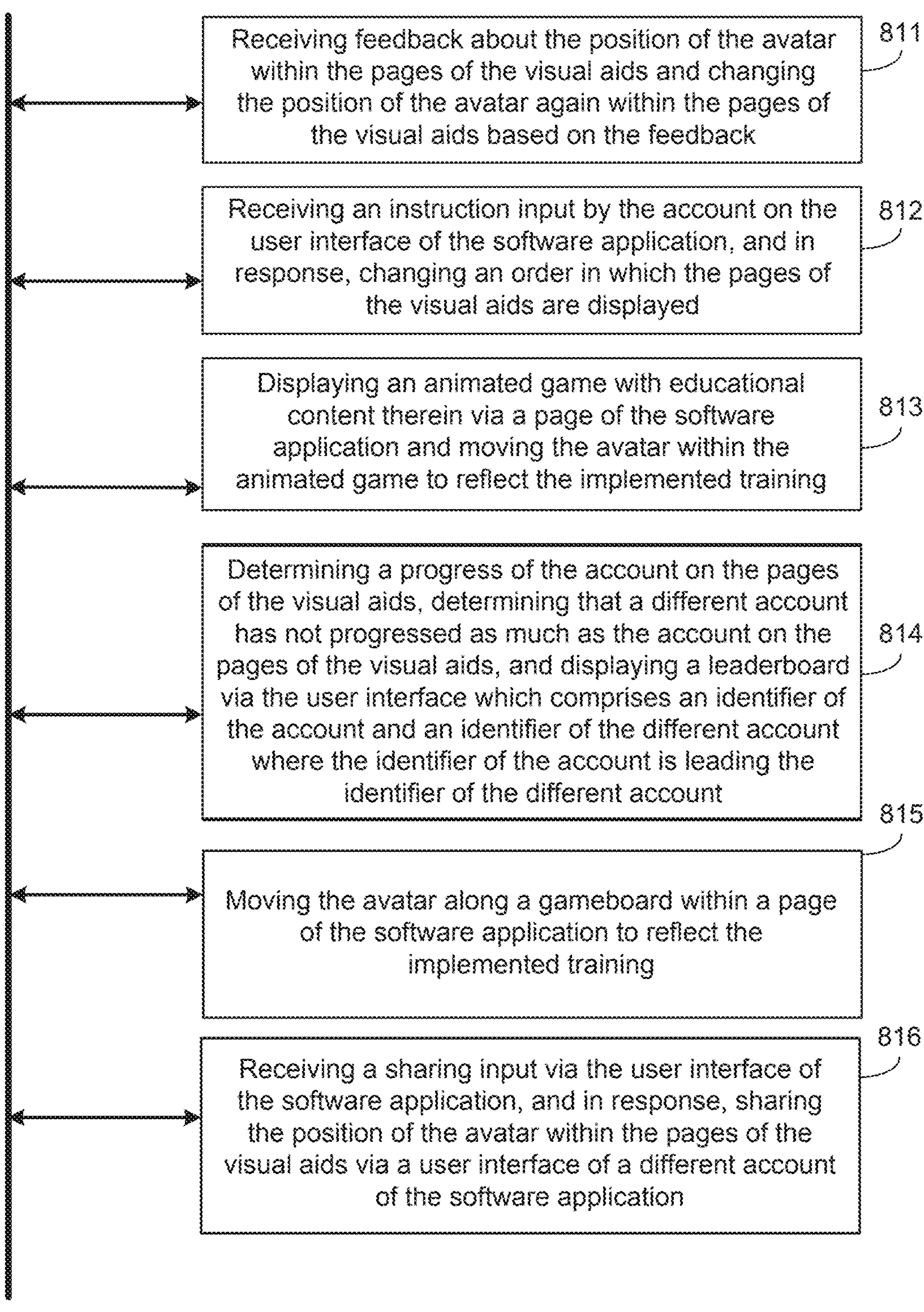
FIG. 8B is an example flow diagram according to example embodiments.

FIG. 8B illustrates a method 810 of an example flow diagram. As an example, the method 810 may be performed by a computing system, a software application, a server, a cloud platform, a combination of systems, and the like. Referring to FIG. 8B, in 811, the method may include receiving feedback about the position of the avatar within the pages of the visual aids and changing the position of the avatar again within the pages of the visual aids based on the feedback. In 812, the method may include receiving an instruction input by the account on the user interface of the software application, and in response, changing an order in which the pages of the visual aids are displayed. In 813, the method may include displaying an animated game with educational content therein via a page of the software application and moving the avatar within the animated game to reflect the implemented training. In 814, the method may include determining a progress of the account on the pages of the visual aids, determining that a different account has not progressed as much as the account on the pages of the visual aids, and displaying a leaderboard via the user interface which comprises an identifier of the account and an identifier of the different account where the identifier of the account is leading the identifier of the different account. In 815, the method may include moving the avatar along a gameboard within a page of the software application to reflect the implemented training. In 816, the method may include receiving a sharing input via the user interface of the software application, and in response, sharing the position of the avatar within the pages of the visual aids via a user interface of a different account of the software application.

In some embodiments, the method may further include receiving feedback about the position of the avatar within the pages of the visual aids and changing the position of the avatar again within the pages of the visual aids based on the received feedback. In some embodiments, the method may further include receiving an instruction input by the user on the user interface of the software application, and in response, changing an order in which the pages of the visual aids are displayed. In some embodiments, the displaying the pages of the visual aids may include displaying an animated game with educational content therein via a page of the software application and moving the avatar within the animated game to reflect the implemented training.

In some embodiments, the method may further include determining a progress of the user on the pages of the visual aids, determining that a different user has not progressed as much as the user on the pages of the visual aids, and displaying a leaderboard via the user interface which comprises an identifier of the user and an identifier of the different user where the identifier of the user is leading the identifier of the different user. In some embodiments, the changing the position of the avatar within the pages of the visual aids to reflect the implemented training may include moving the avatar along a gameboard within a page of the software application to reflect the implemented training. In some embodiments, the method may further include receiving a sharing input via the user interface of the software application, and in response, sharing the position of the avatar within the pages of the visual aids via a user interface of a different user of the software application.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example computer system architecture, which may represent or be integrated in any of the above-described components, etc.

Figure 9:
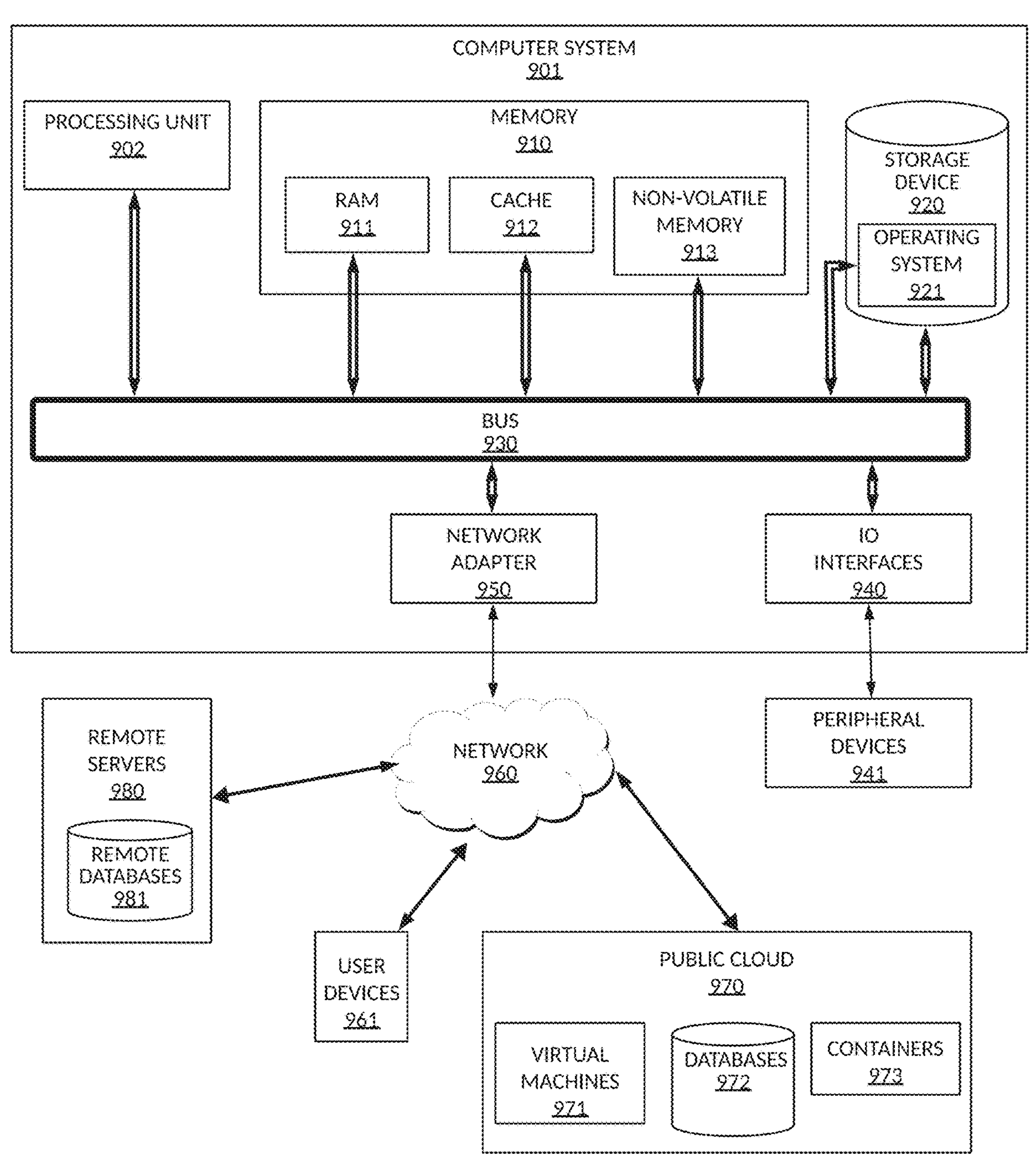
FIG. 9 is a diagram illustrating a computing system that may be used in any of the example embodiments described herein.

FIG. 9 illustrates a computing environment according to example embodiments. FIG. 9 is not intended to suggest any limitation as to the scope of use or functionality of embodiments of the application described herein. Regardless, the computing environment 900 can be implemented to perform any of the functionalities described herein. In computer environment 900, there is a computer system 901, operational within numerous other general-purpose or special-purpose computing system environments or configurations.

Computer system 901 may take the form of a desktop computer, laptop computer, tablet computer, smartphone, smartwatch or other wearable computer, server computer system, thin client, thick client, network PC, mini computer system, mainframe computer, quantum computer, and distributed cloud computing environment that include any of the described systems or devices, and the like or any other form of computer or mobile device now known or to be developed in the future that is capable of running a program, accessing a network 960 or querying a database. Depending upon the technology, the performance of a computer-implemented method may be distributed among multiple computers and among multiple locations. However, in this presentation of the computing environment 900, a detailed discussion is focused on a single computer, specifically computer system 901, to keep the presentation as simple as possible.

Computer system 901 may be located in a cloud, even though it is not shown in a cloud in FIG. 9. On the other hand, computer system 901 is not required to be in a cloud except to any extent as may be affirmatively indicated. Computer system 901 may be described in the general context of computer system-executable instructions, such as program modules, executed by a computer system 901. Generally, program modules may include routines, programs, objects, components, logic, data structures, and so on that perform tasks or implement certain abstract data types. As shown in FIG. 9, computer system 901 in computing environment 900 is shown in the form of a general-purpose computing device. The components of computer system 901 may include, but are not limited to, one or more processors or processing units 902, a system memory 910, and a bus 930 that couples various system components, including system memory 910 to processor 902.

Processing unit 902 includes one or more computer processors of any type now known or to be developed. The processing unit 902 may contain circuitry distributed over multiple integrated circuit chips. The processing unit 902 may also implement multiple processor threads and multiple processor cores. Cache 912 is a memory that may be in the processor chip package(s) or may be located "off-chip," as depicted in FIG. 9. Cache 912 is typically used for data or code that should be available for rapid access by the threads or cores running on the processing unit 902. In some computing environments, processing unit 902 may be designed to work with qubits and perform quantum computing.

Memory 910 is any type of volatile memory now known or to be developed in the future. Examples include dynamic type random access memory (RAM) 911 or static type RAM 911. Typically, the volatile memory is characterized by random access, but this is not required unless affirmatively indicated. In computer system 901, memory 910 is located in a single package and is internal to computer system 901, but alternatively or additionally, the volatile memory may be distributed over multiple packages and/or located externally with respect to computer system 901. By way of example only, memory 910 can be provided for reading from and writing to a non-removable, non-volatile magnetic media (shown as storage device 920, and typically called a "hard drive"). Memory 910 may include at least one program product having a set (e.g., at least one) of program modules that are configured to carry out the functions of various embodiments of the application. A typical computer system 901 may include cache 912, a type of specialized volatile memory generally faster than RAM 911 and generally located closer to the processing unit 902. Cache 912 stores frequently accessed data and instructions accessed by the processing unit 902 to speed up processing time. The computer system 901 may also include non-volatile memory 913 in the form of ROM, PROM, EEPROM, and flash memory. Non-volatile memory 913 often contains programming instructions for starting the computer, including the basic input/output system (BIOS) and information required to start the operating system 921.

Computer system 901 may include a removable/non-removable, volatile/non-volatile computer storage device 920. By way of example only, storage device 920 can be a non-removable, non-volatile magnetic media (not shown and typically called a "hard drive"). It can be connected to the bus 930 by one or more data interfaces. In embodiments where computer system 901 is required to have a large amount of storage (for example, where computer system 901 locally stores and manages a large database), then this storage may be provided by peripheral storage devices 920 designed for storing very large amounts of data, such as a storage area network (SAN) that is shared by multiple, geographically distributed computers.

The operating system 921 is software that manages computer system 901 hardware resources and provides common services for computer programs. Operating system 921 may take several forms, such as various known proprietary operating systems or open-source Portable Operating System Interface type operating systems that employ a kernel.

The bus 930 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. The bus 930 is the signal conduction path that allows the various components of computer system 901 to communicate with each other.

Computer system 901 may also communicate with one or more peripheral devices 941 via an input/output (I/O) interface 940. Such devices may include a keyboard, a pointing device, a display, etc.; one or more devices that enable a user to interact with computer system 901; and/or any devices (e.g., network card, modern, etc.) that enable computer system 901 to communicate with one or more other computing devices. Such communication can occur via I/O interfaces 940. As depicted, IO interface 940 communicates with the other components of computer system 901 via bus 930.

Network adapter 950 enables the computer system 901 to connect and communicate with one or more networks 960, such as a local area network (LAN), a wide area network (WAN), and/or a public network (e.g., the Internet). It bridges the computer's internal bus 930 and the external network, allowing data to be exchanged efficiently and reliably. Network adapter 950 may include hardware, such as modems or Wi-Fi signal transceivers, software for packetizing and/or de-packetizing data for communication network transmission. Network adapter 950 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Network 960 is any computer network that can receive and/or transmit data. Network 960 can include a WAN, LAN, private cloud, or public Internet, capable of communicating computer data over non-local distances by any technology for communicating computer data now known or to be developed in the future. Any connection depicted can be wired and/or wireless and may traverse other components that are not shown. In some embodiments, a network 960 may be replaced and/or supplemented by LANs designed to communicate data between devices located in a local area, such as a Wi-Fi network. The network 960 typically includes computer hardware such as copper transmission cables, optical transmission fibers, wireless transmission, routers, firewalls, switches, gateway computers, edge servers, and network infrastructure known now or to be developed in the future. Computer system 901 connects to network 960 via network adapter 950 and bus 930.

User devices 961 are any computer systems used and controlled by an end user in connection with computer system 901. For example, in a hypothetical case where computer system 901 is designed to provide a recommendation to an end user, this recommendation would typically be communicated from network adapter 950 of computer system 901 through network 960 to a user device 961, allowing user device 961 to display, or otherwise present, the recommendation to an end user. User devices can be a wide array of devices, including personal computers (PCs), laptop computers, tablet computers, hand-held computers, mobile phones, etc.

A public cloud 970 is on-demand availability of computer system resources, including data storage, and computing power, without direct active management by the user. Public clouds 970 are often distributed, with data centers in multiple locations for availability and performance. Computing resources on public clouds 970 are shared across multiple tenants through virtual computing environments comprising virtual machines 971, databases 972, containers 973, and other resources. A container 973 is an isolated, lightweight software for running an application on the host operating system 921. Containers 973 are built on top of the host operating system's kernel and contain only applications and some lightweight operating system APIs and services. In contrast, virtual machines 971 are a software layer which include a complete operating system 921 and kernel. Virtual machines 971 are built on top of a hypervisor emulation layer designed to abstract a host computer's hardware from the operating software environment. Public clouds 970 generally offer hosted databases 972 abstracting high-level database management activities.

Remote servers 980 are any computers that serve at least some data and/or functionality over a network 960, for example, WAN, a virtual private network (VPN), a private cloud, or via the Internet to computer system 901. These networks 960 may communicate with a LAN to reach users. The user interface may include a web browser or an application that facilitates communication between the user and remote data. Such applications have been referred to as "thin" desktop applications or "thin clients." Thin clients typically incorporate software programs to emulate desktop sessions. Mobile applications can also be used. Remote servers 980 can also host remote databases 981, with the database located on one remote server 980 or distributed across multiple remote servers 980. Remote databases 981 are accessible from database client applications installed locally on the remote server 980, other remote servers 980, user devices 961, or computer system 901 across a network 960.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a memory; and a processor coupled to the memory, the processor configured to:

onboard a user with a child version of a software application and store an account characteristic within an account profile of the software application;

connect a parent version of the software application to the child version of the software application, wherein the processor enables the parent version of the software application to control functionality within the child version of the software application;

determine that a current account characteristic of the user with the child version of the software application has reached a predetermined account characteristic threshold based on the account characteristic stored within the account profile and a system clock of a host platform of the software application; and in response, automatically disconnect the parent version of the software application from the child version of the software application.

2. The apparatus of claim 1, wherein the processor is further configured to determine that the account profile has reached a new milestone based on activity within the account profile, and in response, transmit a notification of the new milestone to the parent version of the software application.

3. The apparatus of claim 1, wherein the processor is further configured to receive an instruction from the parent version of the software application, and in response, dynamically activate one or more additional features of the software application in association with the account profile.

4. The apparatus of claim 1, wherein the processor is further configured to receive a request to disconnect the parent version of the software application from the child version of the software application prior to the current account characteristic of the user reaching the predetermined account characteristic threshold, and in response, decline the request to disconnect the parent version of the software application.

5. The apparatus of claim 1, wherein the processor is further configured to receive a request to disconnect the parent version of the software application from the child version of the software application and determine that the current account characteristic of the user with the child version of the software application has newly reached the predetermined account characteristic threshold in response to receipt of the request.

6. The apparatus of claim 1, wherein the processor is further configured to receive an instruction from the parent version of the software application, and in response, dynamically activate educational content within the child version of the software application and display a notification about the educational content via a user interface of the child version of the software application.

7. The apparatus of claim 1, wherein the processor is further configured to receive an input from a user interface of the child version of the software application which indicates completion of a task by the user, and in response, transfer value from an account profile associated with the parent version of the software application to an account profile associated with the child version of the software application.

8. The apparatus of claim 1, wherein the processor is further configured to receive an instruction from the parent version of the software application which includes a new task to be performed by the user, and in response, display an identifier of the new task within a user interface of the child version of the software application.

9. A method comprising:

onboarding a user with a child version of a software application, wherein the onboarding comprises storing an account characteristic within an account profile of the software application;

connecting a parent version of the software application to the child version of the software application, wherein the connecting comprises enabling the parent version of the software application to control functionality within the child version of the software application;

determining that a current account characteristic of the user with the child version of the software application has reached a predetermined account characteristic threshold based on the account characteristic stored within the account profile and a system clock of a host platform of the software application; and in response, automatically disconnecting the parent version of the software application from the child version of the software application.

10. The method of claim 9, wherein the method further comprises determining that the account profile has reached a new milestone based on activity within the account profile, and in response, transmitting a notification of the new milestone to the parent version of the software application.

11. The method of claim 9, wherein the method further comprises receiving an instruction from the parent version of the software application, and in response, dynamically activating one or more additional features of the software application in association with the account profile.

12. The method of claim 9, wherein the method further comprises receiving a request to disconnect the parent version of the software application from the child version of the software application prior to the current account characteristic of the user reaching the predetermined account characteristic threshold, and in response, declining the request to disconnect the parent version of the software application.

13. The method of claim 9, wherein the method further comprises receiving a request to disconnect the parent version of the software application from the child version of the software application, wherein the determining comprises determining that the current account characteristic of the user with the child version of the software application has newly reached the predetermined account characteristic threshold in response to receiving the request.

14. The method of claim 9, wherein the method further comprises receiving an instruction from the parent version of the software application, and in response, dynamically activating educational content within the child version of the software application and displaying a notification about the educational content via a user interface of the child version of the software application.

15. The method of claim 9, wherein the method further comprises receiving an input from a user interface of the child version of the software application which indicates completion of a task by the user, and in response, transferring value from an account profile associated with the parent version of the software application to an account profile associated with the child version of the software application.

16. The method of claim 9, wherein the method further comprises receiving an instruction from the parent version of the software application which includes a new task to be performed by the user, and in response, displaying an identifier of the new task within a user interface of the child version of the software application, wherein the new task is based on at least one of training an artificial intelligence (AI) model or executing the AI model.

17. A non-transitory computer-readable storage medium comprising instructions stored therein which when executed by a processor cause a computer to perform:

onboarding a user with a child version of a software application, wherein the onboarding comprises storing an account characteristic within an account profile of the software application;

connecting a parent version of the software application to the child version of the software application, wherein the connecting comprises enabling the parent version of the software application to control functionality within the child version of the software application;

determining that a current account characteristic of the user with the child version of the software application has reached a predetermined account characteristic threshold based on the account characteristic stored within the account profile and a system clock of a host platform of the software application; and in response, automatically disconnecting the parent version of the software application from the child version of the software application.

18. The non-transitory computer-readable storage medium of claim 17, wherein the processor is further configured to perform determining that the account profile has reached a new milestone based on activity within the account profile, and in response, transmitting a notification of the new milestone to the parent version of the software application.

19. The non-transitory computer-readable storage medium of claim 17, wherein the processor is further configured to perform receiving an instruction from the parent version of the software application, and in response, dynamically activating one or more additional features of the software application in association with the account profile.

20. The non-transitory computer-readable storage medium of claim 17, wherein the processor is further configured to perform receiving a request to disconnect the parent version of the software application from the child version of the software application prior to the current account characteristic of the user reaching the predetermined account characteristic threshold, and in response, declining the request to disconnect the parent version of the software application.

* * * * *